United States Patent

Boom et al.

[15] 3,657,736

[45] Apr. 18, 1972

[54] METHOD OF ASSEMBLING SUBROUTINES

[72] Inventors: Roger J. Boom; John M. Cotton; Martin J. Goodier; David C. Cosserat, all of Taplow, England

[73] Assignee: Plessey Btr Limited, Taplow, England

[22] Filed: Dec. 22, 1969

[21] Appl. No.: 887,144

[30] Foreign Application Priority Data

Jan. 2, 1969 Great Britain ............................193/69

[52] U.S. Cl. ................................................340/172.5, 444/1
[51] Int. Cl. ............................................................G06f 9/00
[58] Field of Search ................................................340/172.5

[56] References Cited

UNITED STATES PATENTS 3,483,524 12/1969 De Buck et al. ....................340/172.5
3,496,551 2/1970 Driscoll et al........................340/172.5

*Primary Examiner*—Raulfe Zache
*Attorney*—Scrivener, Parker, Scrivener & Clarke

[57] ABSTRACT

The invention relates to data processing systems and particularly to intercommunication arrangements for use in multiprocessor systems of the distributed algorithm type. In such systems each programme routine is provided with at least one input data area (input well) and at least one output data area (output well) each routine being arranged to process a block of data (input data packet) in an input well and to produce a processed block of data (output data packet) in an output well. Additionally common data areas (queues) are provided arranged to temporarily store related data packets on a first-in first-out basis. The processor input-output instructions are used to provide automatically activated arrangements to transfer a data packet from a relevant queue to a particular routine related input well immediately prior to the commencement of a programme routine and to transfer the processed data pocket to a relevent queue from an output well immediately after the completion of the routine regardless of the relative locations of the co-operating wells and queues. The provision of input and output wells allows for the use of self-contained programme-routines while the provision of queues between routines allows for the asynchronous performance of those routines.

4 Claims, 14 Drawing Figures

Patented April 18, 1972 3,657,736

13 Sheets-Sheet 9

METHOD OF ASSEMBLING SUBROUTINES

Figure 1A:
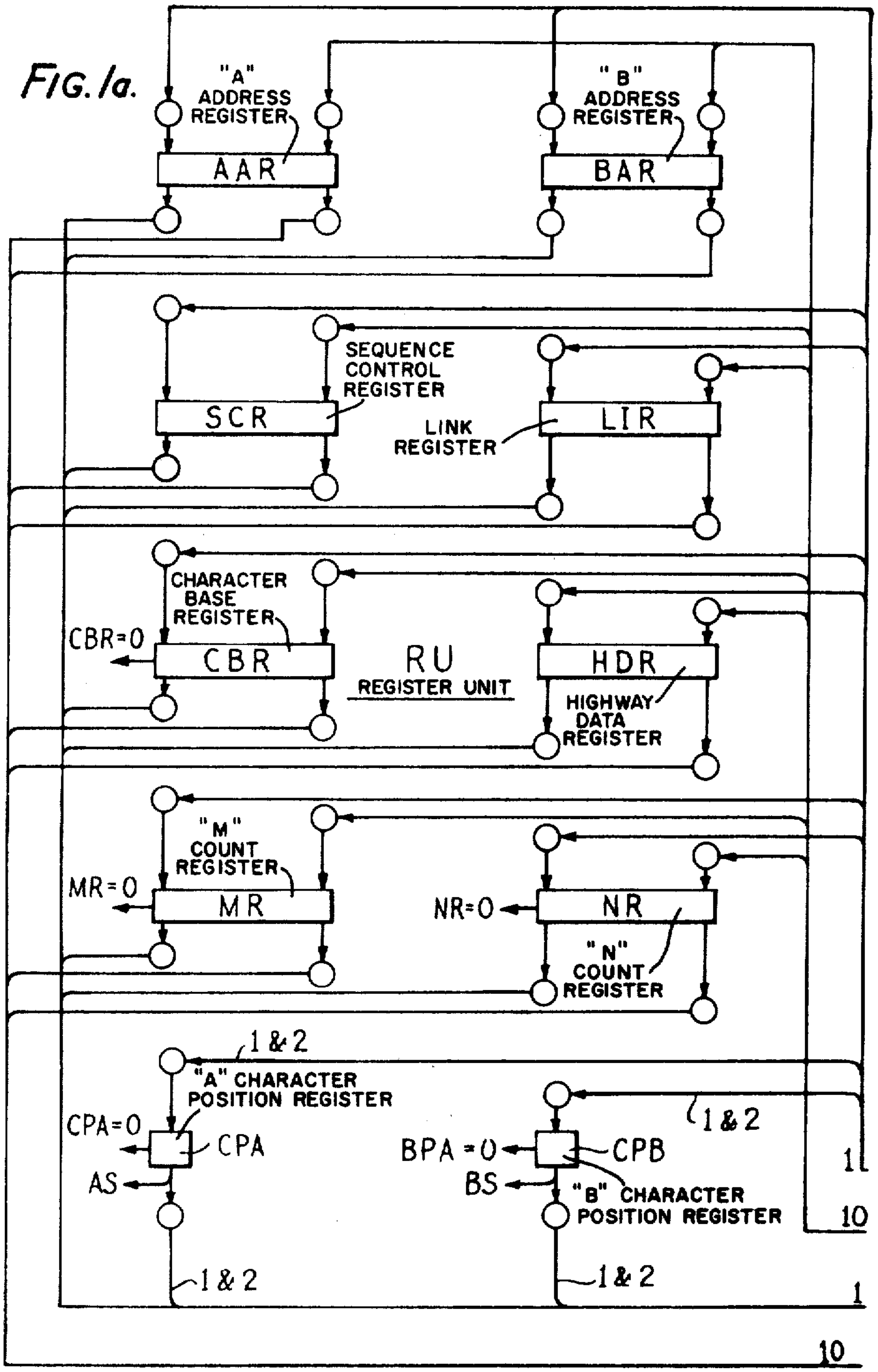

The present invention relates to multi-data processing complexes and is more particularly concerned with such complexes operated on-line and in real-time for the control and supervisory of processes, intercommunication switching systems or the like.

Typical of the invention's application, but by no means limiting thereto, is in the fabrication of a stored programme controlled telephone switching system in which the overall functioning of the control of the switching exchange network is performed under stored program control. Ideally the entire program of logical functions of the telephone exchange control is written as a single exchange algorithm and is performed by a single data processing device. The data processing device obeys, in sequence, the logical steps necessary to process a telephone call handling a plurality of calls "in parallel" with branching occurring under normal program jump methods and the external condition changes being serviced by standard priority interrupt methods. However, such an arrangement requires either a very powerful and fast data processing device, duplicated for security purposes, or a plurality of powerful data processing devices provided on a traffic basis. Both of the above-mentioned systems tend to be costly and somewhat inflexible as far as expansion of the system to be controlled is concerned.

It is, therefore, proposed to provide a system for use in stored program controlled systems which consists of a plurality of similar and relatively simple data processing devices each having responsibility for only part of the entire control system or exchange algorithm. This type of system philosophy is best implemented by breaking down the exchange algorithm into a plurality of routines and it is one of the objects of the present invention to provide arrangements allowing each routine to be internally self-contained asynchronously working upon inputted data producing processed output data without reference to other routines or external processes in the performance of its task. Externally produced information or the production of processed data packets being typical of the "-stimulus points" for such routines. The self-contained routines are distributed over the plurality of data processing devices in as even a manner as possible, each device having the responsibility for a number of routines. The routines in any one data processing device may be related, however, this may not be rigidly adhered to, dependent upon the size and repetition periods of particular routines. The data processing devices are interconnected by way of data transmission or highway systems which may conveniently be of the type disclosed in our British U.S. Pat. No. 1,168,476.

According to the present invention there is provided a data processing arrangement employing a procedure which is divided into a plurality of functions each function being performed under the control of a corresponding program routine stored in a unique storage area and consisting of a sequence of program instructions arranged to appropriately control the data processing arrangement, characterized in that each said routine storage area has associated with it an input data storage area for accommodating a single input data packet and an output data storage area for accommodating a single processed data packet and said data processing arrangement is conditioned when performing in accordance with a program routine to process an input packet present in said data input area and to produce a relevant processed data packet in said output data storage area, the data processing arrangement being further characterized in that it incorporates a plurality of further storage areas each having storage capabilities for a plurality of data packets and a said input data packet is transferred under the control of a first transfer control means from a defined further data storage area to said input data storage area preparatory to commencement of a routine and said processed data packet is promptly transferred under control of a second transfer control means from said output data storage area to a defined other further storage area after the completion of the routine.

The input data storage areas, said output data storage areas and said further data storage areas may each be formed of a separate plurality of data word storage locations in the main store of a data processing device and each said input data storage area may correspond in size to the data packet relevant to said routine while said output data storage area may correspond in size to said processed data packet produced by said routine. Each said further data storage area may have associated with said data word storage locations, transfer control word locations used to store transfer control information relevant to the data packets stored in said further data storage area.

The transfer control word locations may include a main control word location storing information relative to (i) a total block count, indicative of the number of data packets currently stored in the further data storage area, (ii) a maximum state of count, indicative of the maximum number of data packets the further data storage area is capable of storing, and (iii) a character count indicative of the number of data characters in a single data packet.

Figure 1B:
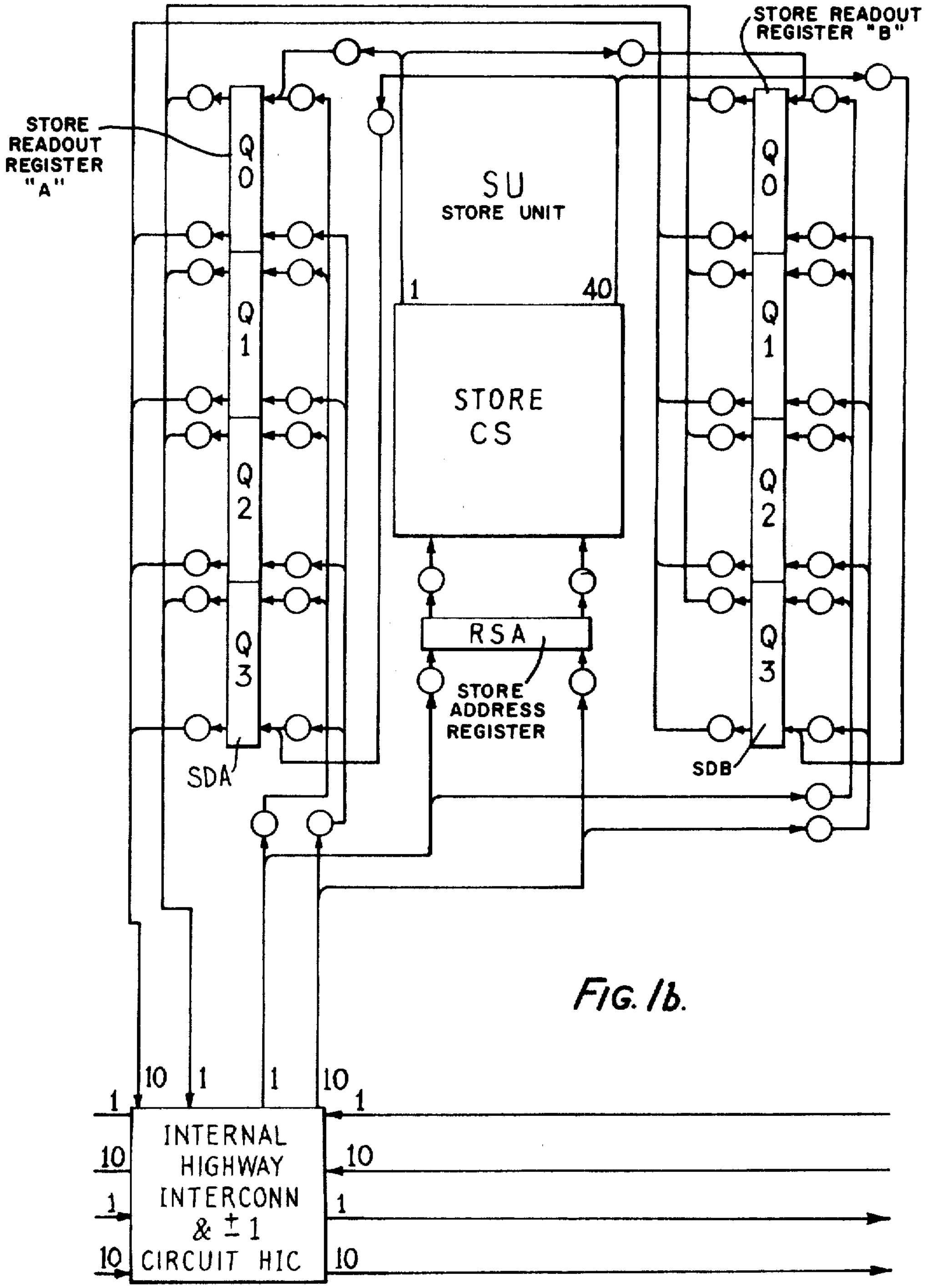
Figure 1C:
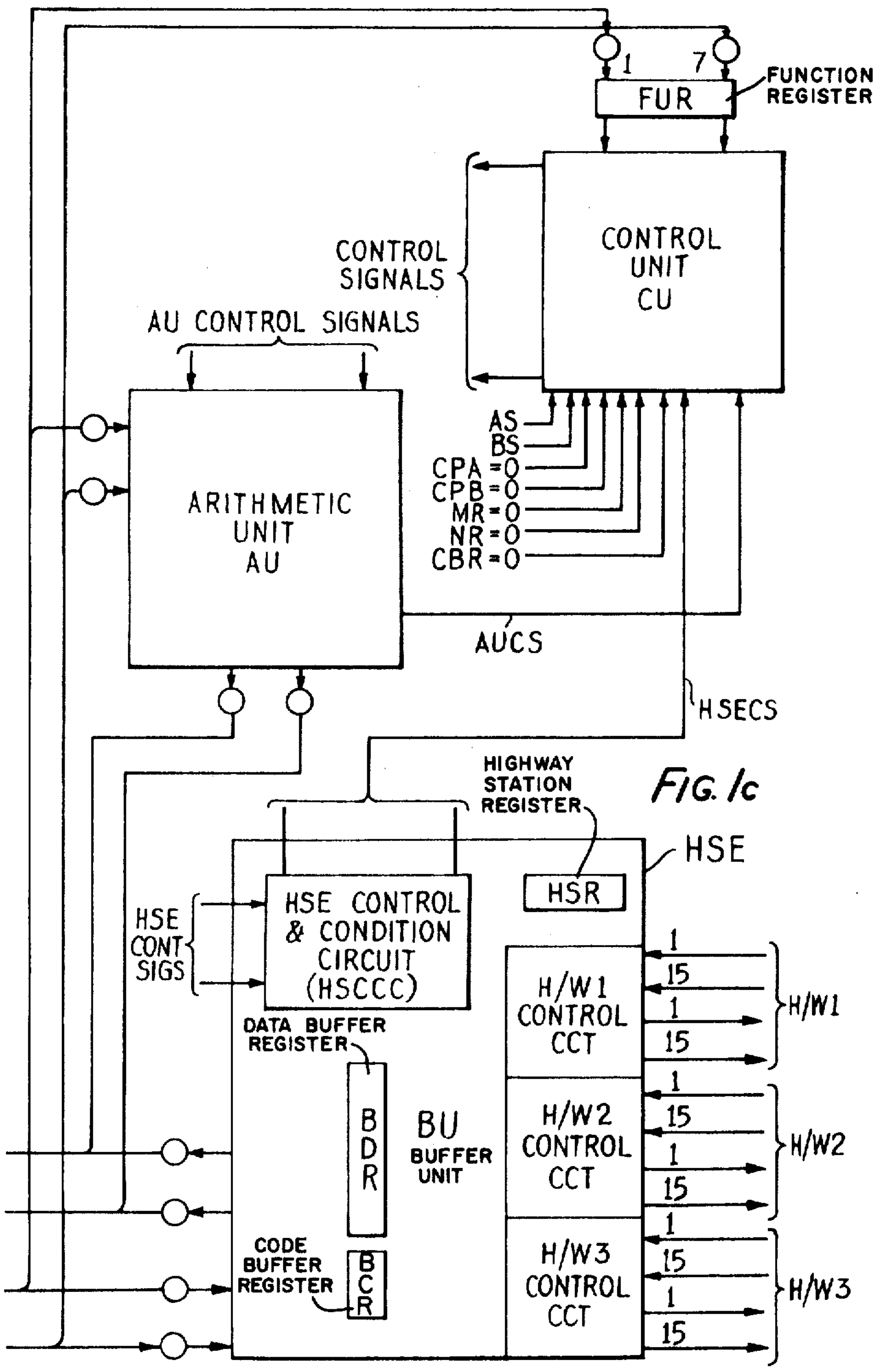
Figure 2A:
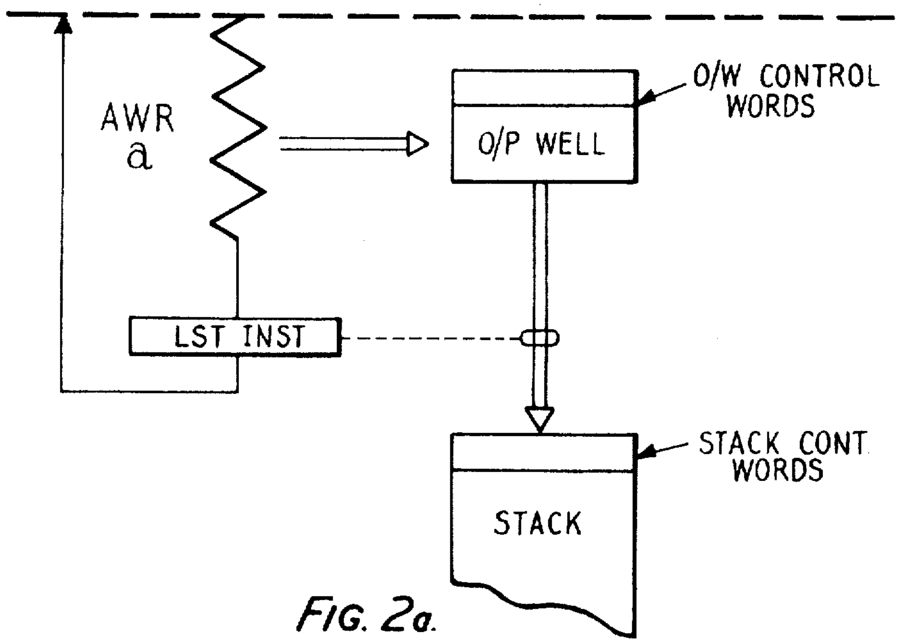
Figure 2B:
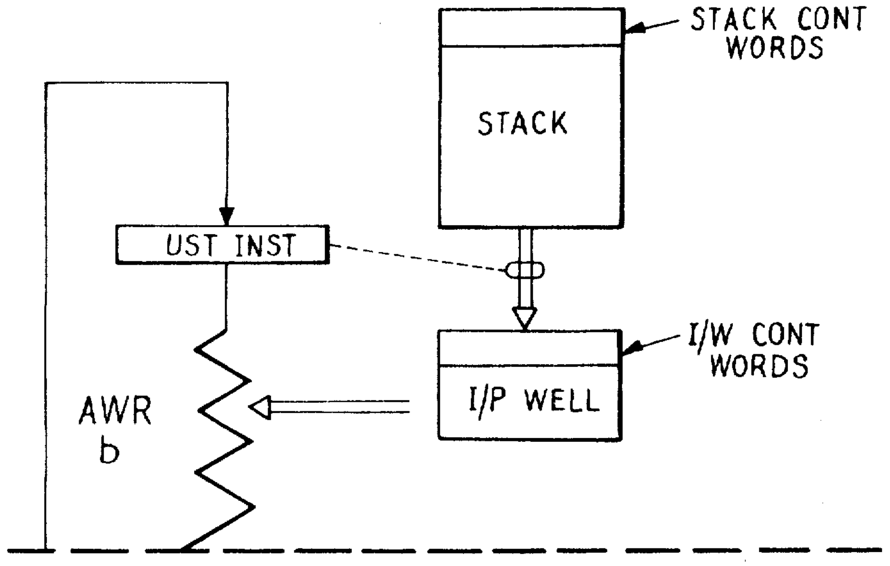
Figure 2C:
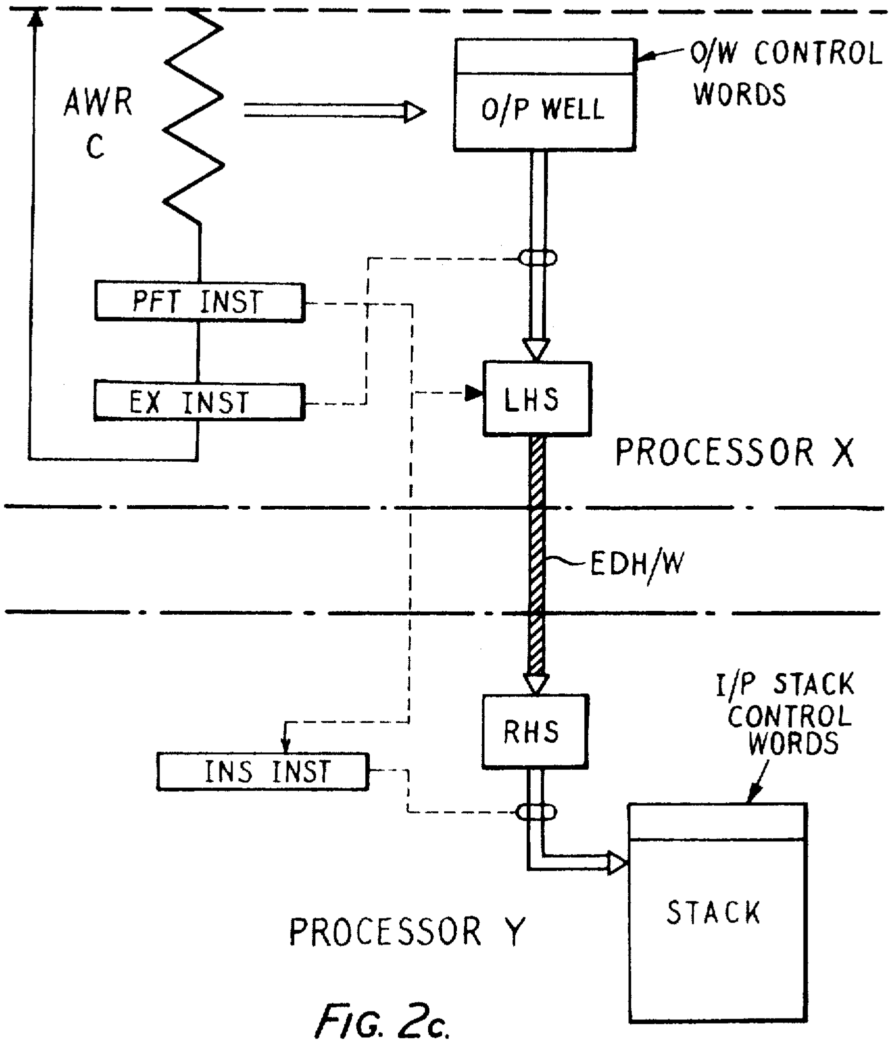
Figure 2D:
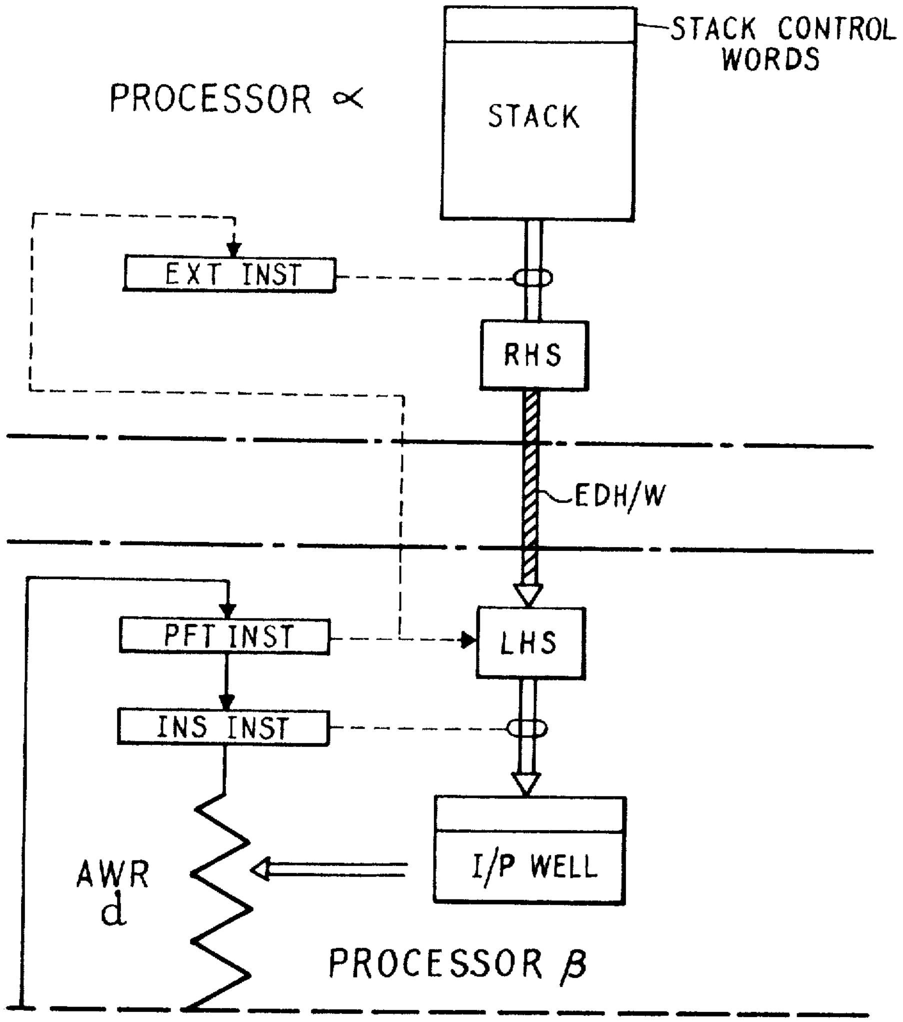
Figure 3:
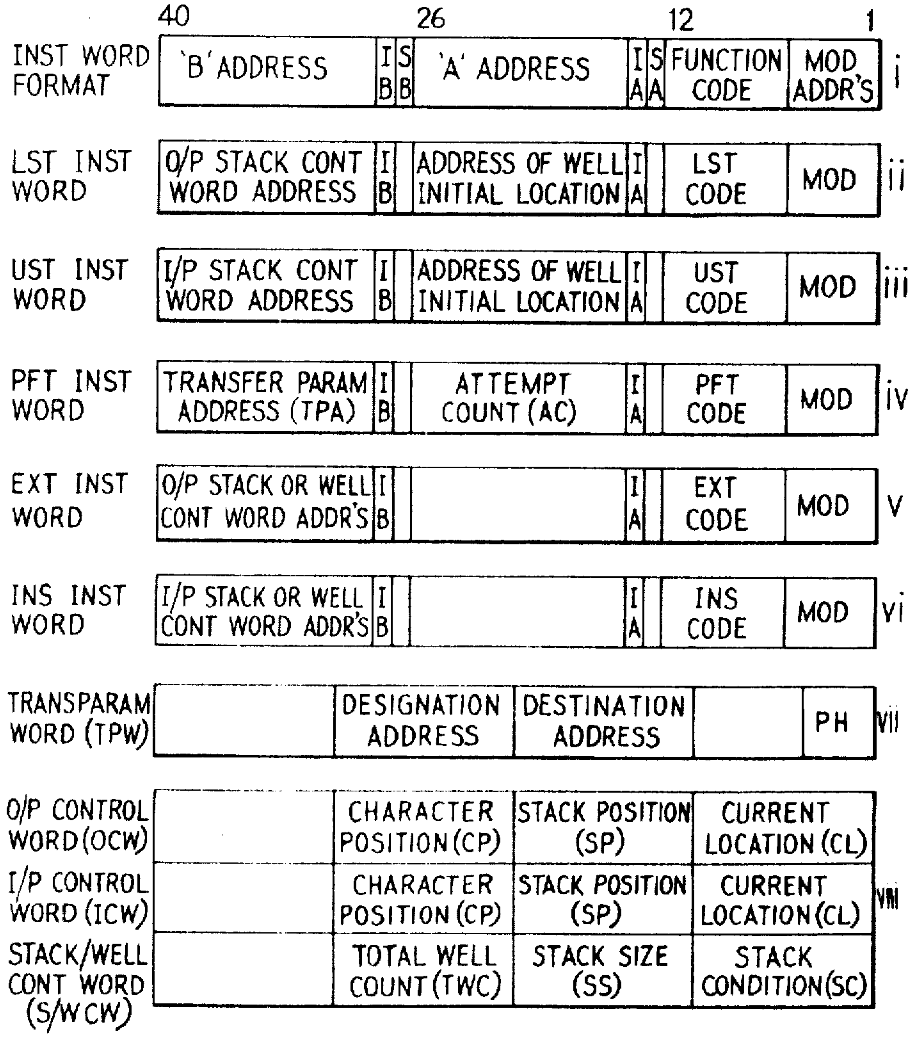

The invention will be more readily understood with reference to the accompanying drawings. Of the drawings:

FIGS. 1*a*, 1*b* and 1*c* show, in block diagram form, a typical data processing device for use with the invention, FIGS. 2*a*, 2*b*, 2*c* and 2*d* show diagrammatic representations of various routines and the data storage and transfer arrangements provided to interlink these routines in accordance with the invention, FIG. 3 shows the data held in the instruction words used in FIGS. 2*a*, 2*b*, 2*c* and 2*d* together with an additional transfer control data word and the layout of the control words for the data wells and stacks used in the invention, while FIGS. 4, 5, 6, 7, 8*a* and 8*b* inclusive show micro-program flow diagrams of the operations performed by the instructions of FIG. 3.

Referring firstly to FIGS. 1*a*, 1*b* and 1*c* which should be placed side by side with FIG. 1*b* in the middle, a broad outline of a typical data processing device suited for use in the invention will be given. The data processing device includes (i) a plurality of data registers in a register unit RU shown in FIG. 1*a*, (ii) a control unit CU, (iii) a main store CS, (iv) an arithmetic unit AU and (v) an external data highway station equipment HSE. All units are served and interconnected by way of internal parallel data highways which are controlled from an interconnection point of view by the INTERNAL HIGHWAY INTERCONNECTION &±1 CIRCUIT (HIC).

The machine is organized on a two-address structure having A and B address for each instruction word. Each instruction word consists of a 40-bit word organised as shown in FIG. 3 section (i). Bits 1 to 5 inclusive of the instruction word define the modifier register to be used in modifying the A and B addresses, bits 6 to 12 define the function code, bits 13 to 26 define the "A" address while bits 27 to 40 define the "B" address. The 14 bits used to define the A and B addresses consist of (a) a 10-bit location address (b) a two bit segment address and (c) two marker bits specifying (i) indirect addressing and (ii) store accumulator contents. The store CS consists of four segments and the required 10-bit address refers to a location within the segment specified by the associated segment address. For ease of presentation, and so as the store organisation above mentioned is only typical for a data processing device in accordance with the invention, the segment and modified facilities have not been shown in FIGS. 1*a*, 1*b* and 1*c*.

The data processing device is organized on a three-phase system for each instruction cycle consisting of a housekeeping phase, an access phase and an execute phase for each instruction. The housekeeping phase allows any fault indications or interrupts to be serviced, the access phase extracts the instruction word data relevant to the next instruction from the store and increments the sequence control number while the execute phase performs the necessary operation specified by the function code of the instruction word. The micro-programs shown in FIGS. 4 to 8*b* inclusive, to be considered later, start at the beginning of an execute phase and assume that the A and B addresses in the A and B address registers (AAR and BAR) are absolute (i.e. they have been modified if required and have been processed for indirect addressing if required).

Referring now to FIG. 1*a* consideration will be given to the register unit RU. The registers shown in FIG. 1*a* have been limited to those used in the performance of the instructions of the invention and may be supplemented by further registers in an actual data processing device. Most of the registers are of identical capacity (i.e. 10 bits) and are connected on both input and output to a 10-bit parallel internal data highway which is also connected to the store unit SU, the arithmetic unit, the control unit and the highway station equipment shown in FIGS. 1*b* and 1*c* through the intermediary of the INTERNAL HIGHWAY INTERCONNECTION &±1 CIRCUIT (HIC).

1. Register Unit RU a. Register AAR, the "A" address register, is used to hold the address of the store location in which one of the data words involved in the instruction resides.

b. Register BAR, the "B" address register, is used to hold the address of the other store location in which one of the data words involved in the instruction resides.

c. Register SCR, the sequence control register, is used to hold the address of the next instruction in the routine currently being performed.

d. Register LIR, the link register, is used to store the sequence control number of an interrupted routine when an autonomous data transfer operation in in progress.

e. Register CBR, the character base register, is used to store a code indicating the condition of a stack and will be considered later with reference to FIG. 4.

f. Register HDR, the highway data register, is used to hold a 10-bit character when input/output transfers are being performed.

g. Register MR, the M count register, is used to hold a data count which will be decreased or increased by circulation around the data highway via the HIGHWAY INTERCONNECTION &±1 CIRCUIT of FIG. 1*b*. This register is provided with a zero contents detector which produces an output signal MR=0 for use in the control unit of FIG. 1*c*.

h. Register NR, the N count register, is similar to the M count register and is provided with similar facilities to that register.

i. Registers CPA and CPB, the character position registers, are of two bits capacity and produce control unit condition signals CPA=0 and CPB=0 when empty. These registers also produce signals AS and BS which are indicative of their states for use in the control unit of FIG. 1*c*.

As mentioned previously all registers in the register unit are loaded from the internal data highway and output to that highway. These operations are under micro-program control and the circles shown in FIG. 1*a*, and indeed throughout the rest of FIGS. 1*a*, 1*b* and 1*c* represent micro-signal controlled gates activated by the control unit when the associated register is to be employed. For ease of presentation the actual micro-signal control leads have been deleted from FIG. 1 and are shown grouped as CONTROL SIGNALS at the output of the control unit of FIG. 1*c*.

2. The store unit SU

This unit shown in FIG. 1*b* consists of a store CS, which may be a core store matrix operated for example in coincident current mode, a pair of store read-out registers SDA and SDB and a store address register RSA.

Each data word held in the store CS consists of 40 bits which may be divided into four quadrants, each quadrant being of 10 bits each. The input and output to the read-out registers SDA and SDB are controlled by control-signal-activated gates and a selection of any quadrant may be made for input or output. The contents of the registers may also be written into the addressed store location and the paths have not been shown in FIG. 1*b* for ease of presentation but are simply 40-bit paths again control-signal-gated into the stores input (also not shown).

3. The arithmetic unit AU

This unit, shown in block form in FIG. 1*c*, includes a normal arithmetic processing unit having ADD, SUBTRACT, SHIFT and such similar facilities and will not be considered in any further detail as its form is not influenced by the invention. The arithmetic unit is loaded and unloaded by way of the internal data highway. Various condition signals are generated by the arithmetic unit AU and these are fed to the control unit CU to influence the micro-programs performed. These condition signals are shown grouped under a single lead AUCS in FIG. 1*c*.

4. The control Unit CU

This unit, shown in block form in FIG. 1*c*, is controlled by the function register FUR, together with internally generated condition signals, and produces CONTROL SIGNALS sequenced as required to perform the required instruction processes. The micro-programs shown in FIGS. 4 to 8*b* are effectively specifications of the control signals produced to perform the instructions to be discussed and the actual CONTROL SIGNALS required will be discussed later with reference to FIGS. 4 to 8*b*.

5. The external highway station HSE

This equipment is shown in skeleton form in FIG. 1*c* and its functions will be discussed in more detail with reference to FIGS. 4 to 8*b* later. Each data processing device in the multi-data processing system previously mentioned is provided with a highway station which is divided into two sections, consisting of a common buffer unit BU and a number of control logic units, one for each pair of highways to which the data processing device has access.

Obviously the type of equipment employed and the operations performed by the highway station HSE depends upon the type of highway system employed. As mentioned previously the invention is ideally, although not exclusively, suited for use with data processing devices which are served by a data highway of the type disclosed in our British Pat. No. 1,168,476.

In the above mentioned highway system each highway consists of 15 lines, 10 data lines, four code lines and one strobe line. Each highway is formed into a ring which passes through a highway station control circuit, such as H/W1 CONTROL CCT. in FIG. 1*c* for each device connected to the highway. At each station the incoming signals are relaunched (or passed on) without modification, except when a message is being sent or received by that station. Each highway control circuit can inhibit the "passage" of the data code or strobe lines independently during transmission or reception, and when a data transfer is being performed from that station the data characters and control codes are fed from buffer registers BDR (the data buffer register) and BCR (the code buffer register) in the buffer unit BU. The following two tables show the codes which are used on the four control code lines, the first in the transmitter-to-receiver direction and the second in the receiver-to-transmitter direction.

TABLE 1

| CODE | SIGNIFICANCE |
|---|---|
| 0 0 0 0 | FREE HIGHWAY |
| 1 0 0 0 | PRIORITY |
| 0 1 0 0 | DESIG. CHAR. |
| 0 1 1 0 | DATA CHAR. |
| 0 1 1 1 | STACK EMPTY |
| 1 1 0 1 | RESPONSE C-O |
| 1 1 1 1 | FAULT |
| 0 1 0 1 | R.C-O PERFORMED |
| 1 1 0 0 | CLOCK |

TABLE 2

| CODE | SIGNIFICANCE |
|---|---|
| 1 0 0 1 | DESTINATION FREE |
| 1 0 1 0 | END OF BLOCK |
| 1 0 1 1 | DESTINATION BUSY |
| 0 0 1 1 | STACK FULL |

The buffer unit BU is arranged to decode the above codes in the HSE CONTROL & CONDITION CIRCUIT (HSCCC) when they occur and to mark a single specific lead which is fed to the control unit of the data processing device when a data transfer is in progress. Additionally the internal data processing device's data highway is taken to the input of the buffer unit and a number of code injection control wires HSE CONT. SIGS. are also provided from the data processing devices control unit CU to the buffer unit BU of the highway station equipment HSE. Finally a pair of indications (i) Highway station ready and (ii) Highway station accept are provided and these indications are active (i) when a new code or character is received or when the previous character or code has been transmitted and (ii) when the next code or data character to be transmitted or the last code or data character to be recirculated has been staticised in the particular register within the buffer unit BU. These indications are not shown separately on FIG. 1*c* but can be considered as being included in the highway station equipment condition signals HSECS.

The above comments are necessarily brief, as the type of highway system with which a data processing device, incorporating the invention, operates is not limited thereto. However the performance of the preferred highway system will be amplified later when considering the flow diagram of the micro-programmes for the instructions provided by the invention with reference to FIGS. 4 to 8*b*.

6. Methods of interlinking asynchronous routines.

Referring to FIGS. 2*a*, 2*b*, 2*c* and 2*d* consideration will now be given to the instructions provided by the invention and their use in interlinking asynchronous working routines (AWR). Each asynchronous working routine is written without reference to the input and output environments and it processes data provided to it, by way of one of its input data wells, deriving data which it presents to one or more output data wells. Each well is one data packet in size and a data packet consists of a plurality of ten bit characters, stored in a defined area of the store CS each store word holding four characters of a packet, the actual number of characters in a data packet being dependent upon the asynchronous working routine requirements and the or those, routines which subsequently process the out-putted data packets. The number of locations required for a well is dependent upon the number of data characters in a data packet and will be given by $3+^{N}/4$ where N equals the number of characters in a data packet.

Referring firstly to FIG. 2*a*, consideration will be given to one method of outputting data packets from an asynchronous working routine AWRa. The routine AWRa is shown diagrammatically in FIG. 2*a* as a "zig-zag" path and this is meant to represent a series of program routine instructions. While the asynchronous working routine is being processed a data packet is assembled in the store locations forming the output well O/P WELL associated with that routine. It should be noted that only one data packet can be assembled in a single output well for each cycle of the routine, however, more than one data packet may be produced by the routine for each cycle and in that case additional wells will be provided. Each well consists of a plurality of storage locations in the core store CS of FIG. 1 consisting of three control word locations followed by a number of locations into which the data packet is assembled under the control of the well control words.

The well control words will be considered in detail later and are shown in FIG. 3 section (viii).

When any asynchronous working routine is complete it is followed by a well servicing instruction or instructions which control the transfer of the generated data packet in the associated WELL into a STACK where the data packet is retained until the next routine in the programme thread is ready to service it. Each stack consists of three control words followed by a plurality of storage locations for the data packets and the data packets are fed into the stack starting with the location immediately below the control words and are removed from the stack commencing with that location. The administration of the stack being under the control of the stack control words. The stack control words, consisting of (i) a main stack control word (SCW), (ii) an input control word (ICW) and (iii) an output control word (OCW), are used in the control of the transfer of the data packets into and out of the stack.

As mentioned previously each asynchronous routine is arranged to terminate with a well servicing instruction or instructions. In the case of a routine well which outputs to a stack contained within the same machine the asynchronous routine is terminated with the instruction "load stack" LST INSTR as shown in FIG. 2*a*. This instruction, whose operations in micro-program flow diagram form will be considered in detail with reference to FIG. 4, controls the extraction of the generated data packet from the output well and the insertion of that data packet into the next free locations in the required STACK. FIG. 3 section (ii) shows the instruction word read out of the programme section of the store when the "load stack" (LST INST) instruction is performed. The A and B address sections of the instruction word are used to specify the store addresses holding the address of the first well word of the routine and the main stack control word respectively. The micro-program of the "load stack" (LST INST) instruction controls the extraction of the data packet from the routine well (O/P WELL) and the insertion of the data packet into the next data packet area in the stack (STACK) and the updating of the stack control words. The exit from the "load stack" instruction is to the machines "housekeeping" cycle causing entry into a further routine or the same routine as required.

Consideration will now be given with reference to FIG. 2*b* to one method of presenting data packets to an asynchronous working routine AWRb. Again the routine AWRb is shown diagrammatically in FIG. 2*b* as a "zig-zag" path and this is meant to represent a series of program routine instructions. The program instructions being those necessary to perform the operations specified by the working routine. Before processing the asynchronous working routine it is obviously necessary to transfer the data packet upon which the routine is to work into the storage locations forming the input well associated with that routine. As shown with reference to FIG. 2*a* the data packets are loaded into a STACK by way of the "load stack" instruction. The "unload stack" instruction (UST INST) is used to transfer the data packet from the STACK to store locations forming the I/P WELL of the routine. The instruction word of the "unload stack" instruction is shown in FIG. 3 section (iii) and this will be read out of the programme section of the store when it is required to commence the asynchronous working routine AWRb. The A and B address sections of the instruction word are used to specify the store locations holding the address of the first word of the routine's input well (I/PWELL) and the control word for the stack from which the data packet is to be unloaded. The micro-program of the "unload stack" instruction (UST INST), which will be considered in detail later with reference to FIG. 5, controls the extraction of the data packet from the next data packet area in the stack (STACK) and the insertion of that data packet into the routines input well (I/PWELL) and the updating of the stack control words. The exit from the "unload stack" instruction is to the actual asynchronous working routine which will process the newly inputted data packet in the well generating an output data packet in an output well which will be handled at the end of the routine in the manner described with reference to FIG. 2*a*.

From the above description it can be seen that the provision of STACKS and WELLS and the two STACK servicing instructions (LST INST. and UST INST) allows the "production" of asynchronous working routines which work on data in an input well producing data for an output well. Thus the work programs, or sub-routines of the original overall control system algorithm, can be written individually and can be assembled in a separate programming operation. This separate programming operation will involve the generating of the A and B addresses for the two instruction words defining the stack and wells locations required. The two instructions so far considered, however, relate only to well-to-stack and stack-to-well transfers internal to a single data processing device (i.e. the stack and wells are all in the one store). As mentioned previously it is envisaged that the entire control system algorithm will be distributed over a number of identical (from a hardware point of view) data processing devices interconnected by way of a data highway system allowing any device access to all other devices. It is therefore, necessary to provide similar arrangements for well-to-stack and stack-to-well transfers involving one or more data processing devices. The actual physical location of the stack will depend upon the timing constraints of the routines which fill and empty these stacks and it is necessary to provide a system which allows stacking at the output of the data processing device generating the data packets or at the input of one or more data processing devices, which contain routines which are to process these data packets. It is necessary, therefore, for a flexible input/output mechanism to be provided in each data processing device, allowing each data processing device to originate a request for transfer in either direction.

As mentioned previously all the data processing devices are interconnected by way of a data highway system and it is, therefore necessary for the transfer to be initiated by one of the data processing devices involved in the transfer and for the required intercommunication path to be set up. After this operation the required mode of transfer is performed involving the relevant well or wells and stack or stacks and using a pair of interacting instructions one in each data processing device. In the detailed micro-programm to be considered later, with reference to FIGS. 6, 7 and 8*a* and 8*b* it has been assumed that the highway system of our British Pat. No. 1,168,476 is employed, however, this has been chosen for ease of explanation and the arrangements of the invention are not limited to such a transfer system for example with suitable alterations to the micro-program a data highway system of the type disclosed in British Pat. No. 1,063,296 could be employed.

Consideration will now be given to a well-to-stack transfer involving the external data highway and this type of transfer is shown in diagrammatic form in FIG. 2*c*. The asynchronous working routine AWRc, as in the case of FIG. 2*a*, processes an input data packet producing an output data packet which is fed into the storage locations forming the output well O/P-WELL. However, the generated data packet is produced in one data processing device PROCESSOR X and is destined, in this case, for a STACK Awhich is physically located in the store of another data processing device PROCESSOR Y.

When the routine is complete, it is necessary to perform the usual well servicing instructions, however, it is also necessary in this case to set up a highway transfer connection. This latter operation is performed under the control of a "prepare for transfer" instruction (PFT INST). The "prepare for transfer" instruction conditions the local data processing device's (PROCESSOR X) highway station LHS to extend signals to seize the external data highway EDH/W and, by the extension of further selection signals, the required remote highway station equipment, associated with the required data processing device (PROCESSOR Y). The instruction word used to perform a "prepare for transfer" (PFT INST) instruction is shown in FIG. 3 section (iv).

The A address of the PFT INST defines an ATTEMPT COUNT and is set to a defined value indicating the number of attempts a routine can make to set up a connection before a fault condition is indicated. The use of this count will be considered in more detail later with reference to the detailed description of the micro-program performed by the "prepare for transfer" instruction shown in FIG. 6. The B address of the PFT INST defines the address of a storage location which holds the "transfer parameters" (TRANSFER PARAM) which are used in the setting up of the required external data highway connection.

The transfer parameters word is shown in FIG. 3 section (vii) and it consists of four sections, of 10 bits each, one of which is not used. The first section, bits 1 to 10 specifies in bits 1 to 5 the permitted highways PH. The second section bits 11 to 20, specifies the destination address while the third section, bits 21 to 30 specifies the designation address.

The permitted highways code PH indicates to the local highway station upon which pair of highways, if more than one pair of highways are provided, the required destination device is connected. This code is used to select the relevant control logic unit associated with that highway pair. The number of bits in this code will depend upon the number of pairs of highways to which the data processing device has access.

The destination address indicates the system code of actual device or routine with which intercommunication is required. This coded address will be passed over the highway to interrogate the remote highway station to see if the required device or routine can be accessed. If a transfer can be accepted the interrupt toggle in the control unit of the remote data processing device is set and the currently processed routine is halted for the duration of the required transfer.

The designation address points to the instruction which will co-operate with that in the originating device and may indicate the location in the store at which the address of that co-operating instruction word may be found. In the case of a successful attempt the designation code will be used to obtain the address of the required co-operating instruction and this instruction will be read out of the store into the functional registers of the interrupted remote data processing device.

Upon the successful completion of the "prepare for transfer" instruction, in FIG. 2*c*, the well servicing instruction, "extract" EX INST., will be performed in the local data processing device PROCESSOR X in conjunction with the co-operating stack servicing instruction, "insert" INS INST, in the remote data processing device PROCESSOR Y.

The "extract" instruction word is shown in FIG. 3 section (v) in which only the B address is used to specify the location in the local data processing device's store which holds the well control word of the 0/PWELL involved in the transfer.

The "insert" instruction word is shown in FIG. 3 section (vi) in which only the B address is used and it specifies the location in the remote data processing device's store which holds the stack control word of the STACK involved in the transfer.

Figure 7:
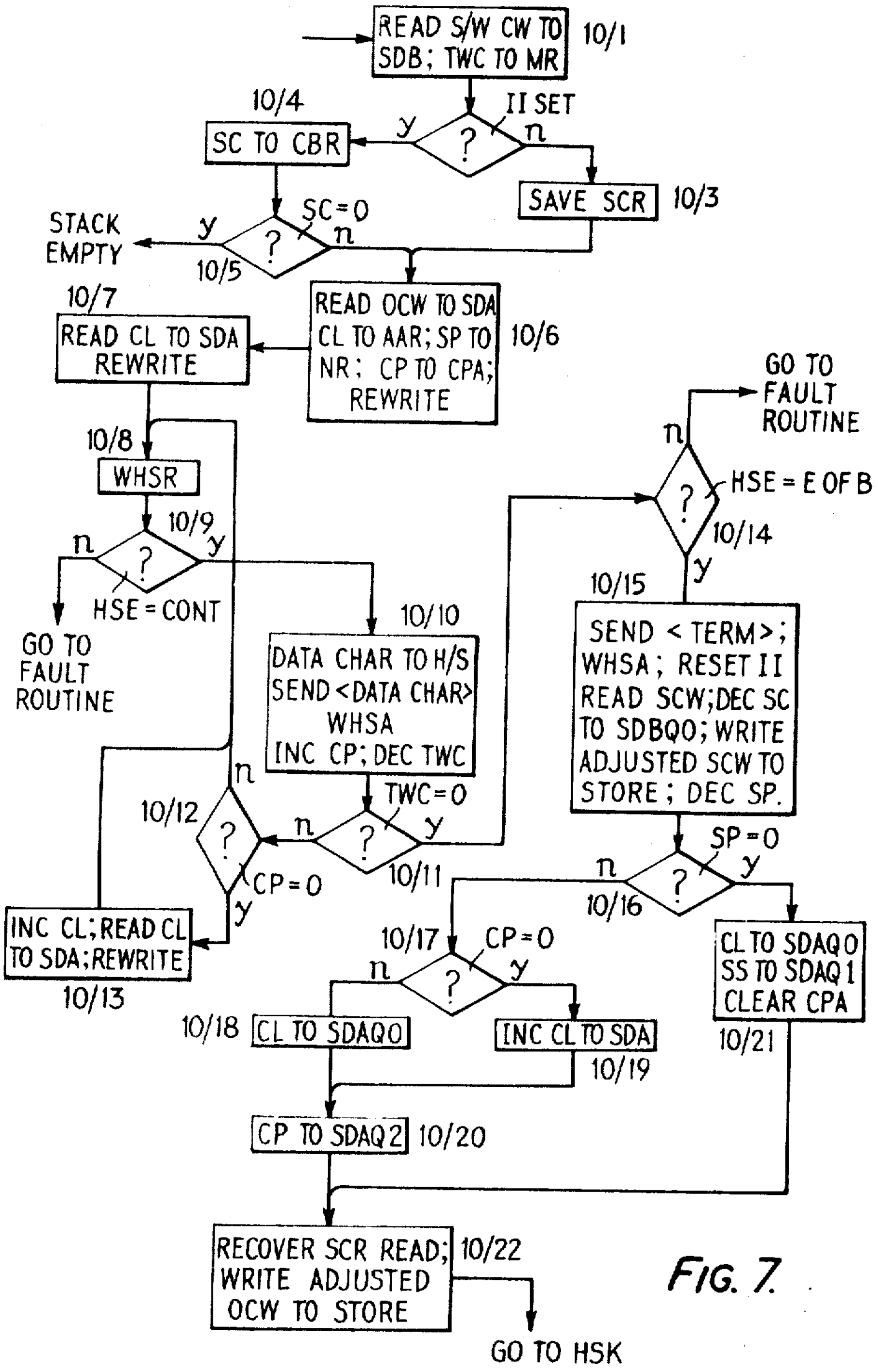
Figure 8A:
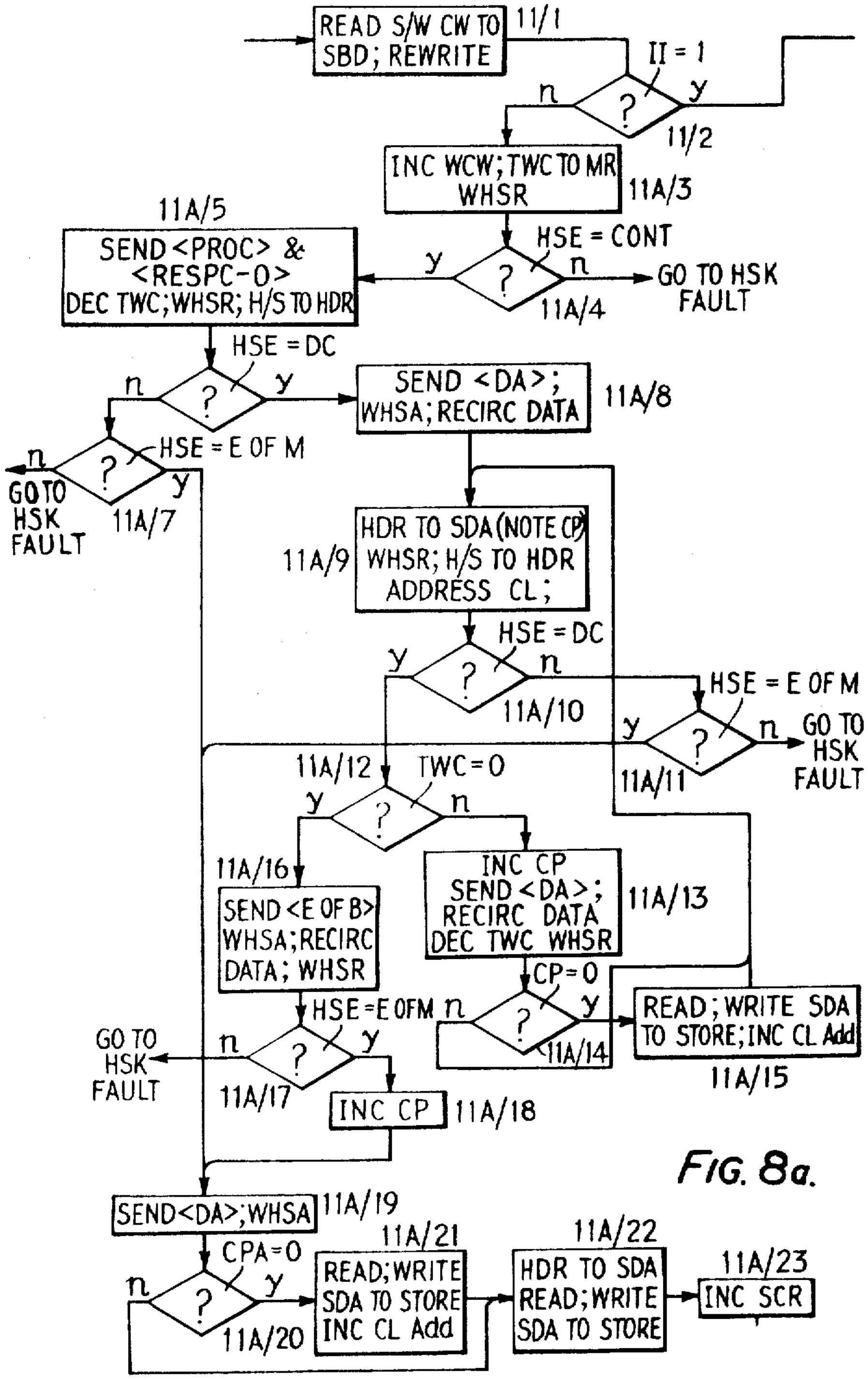
Figure 8B:
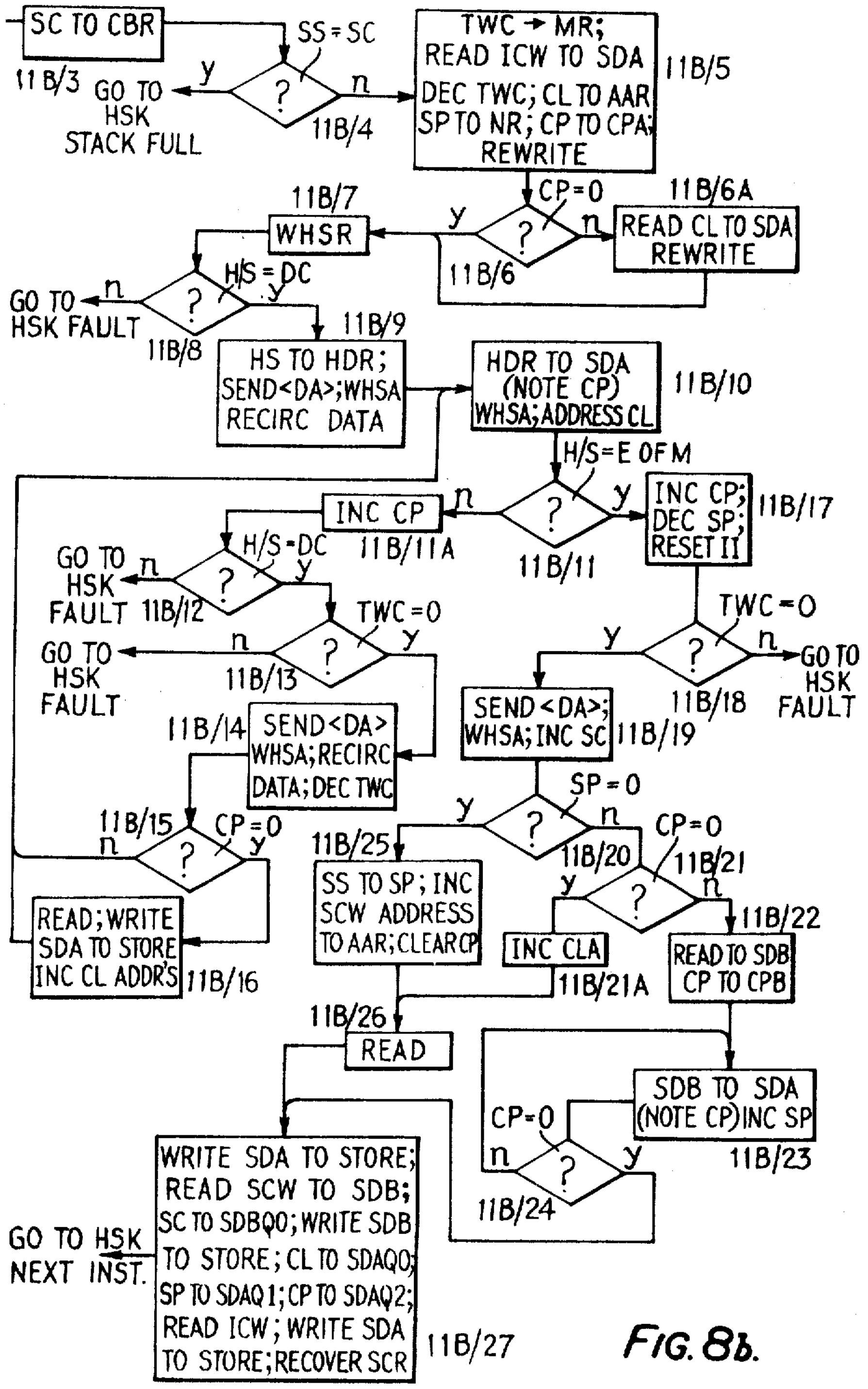

The micro-program of the extract, EX INST, and insert, INS INST, instructions, which will be considered in detail later with reference to FIGS. 7 and 8*b* respectively, control (i) the extraction of the data packet, a 10-bit character at a time, from the output data well 0/PWELL, (ii) the transfer of a data character over the selected external data highway EDH/W (iii) the reception and assembly of the data packet into the next location in the STACK and (iv) the updating of the well and stack control words. The operations performed by these instructions are locked together by way of the data highway transfer mechanism.

Upon the completion of the "extract" instruction the local data processing device PROCESSOR X will enter a housekeeping cycle causing entry into a further routine or the start of the same routine as required.

Upon completion of the "insert" instruction the remote data processing device, PROCESSOR Y, will enter a housekeeping cycle causing the interrupted routine to be re-entered at the point of interruption, using the address information contained in the originally accessed designation address defined location.

Consideration will now be given to a stack-to-well transfer involving the external data highway and this type of transfer is shown diagrammatically in FIG. 2*d*. The asynchronous wording routine AWRd, as in the case of FIG. 2*b*, operates upon a data packet supplied to it from the store locations which form its own input well I/PWELL. Before entering the routine AWRd it is necessary to transfer the data packet upon which the routine is to work into the storage locations forming the input well I/PWELL for that routine. In the present case, however, the storage locations forming the STACK, from which the required data packets are to be taken, reside in a data processing device other than that in which the well resides (i.e., the stack is in PROCESSOR α while the well is in PROCESSOR β).

Again the well servicing instruction "insert" INS INST is prefaced with a "prepare for transfer" instruction PFT which performs in an identical manner to that discussed above except that the instruction accessed by the designation address in the remote data processing device PROCESSOR α will be an "extract" instruction not an "insert" instruction.

Upon the completion of the "prepare for transfer" instruction the "insert" instruction INS INST will be performed in the local data processing device PROCESSOR α while the co-operating "extract" instruction EX INST is performed in the remote data processing device PROCESSOR β. The operation performed by both instruction micro-program, which will be discussed in detail later with reference to FIGS. 7 and 8a, are locked together by way of the data highway transfer system and they cause a single data packet, a character at a time to be passed from the STACK to the I/PWELL. It should be noted that the originator of the data transfer is PROCESSOR β while the required data transfer is from PROCESSOR α to PROCESSOR β. This apparent incompatability is catered for by providing the highway stations with a "response change-over" facility which is activated at the start of the "insert" instruction micro-program. The final operations of the two co-operating instructions causes the updating of the STACK and I/PWELL control words.

Upon the completion of the insert instruction INS INST, the local data processing device PROCESSOR β will enter a housekeeping cycle causing entry into the asynchronous working routine AWRd.

Upon completion of the extract instruction EX INST the remote data processing device PROCESSOR α will enter a house-keeping cycle causing the interrupted routine to be resumed at the point of interruption.

In the above description reference has been made to the stack and well control words. These control words are physically placed "on top" of the store locations constituting the well or stack.

The stack or well control words will now be discussed with reference to FIG. 3 section (viii) and they consist of a main stack or well control word S/WCW and two transfer control words ICW and OCW.

The main stack or well control word S/WCW consists of three sections (i) the stack condition code (SC) section (ii) the stack size code (SS) section and (iii) the total well count (TWC) section.

The stack condition code (SC) is used to keep a running total of the number of data packets in the stack and is incremented by input instructions (INS INST. and LST) and decremented by output instructions (EX INST and UST) after each successful transfer. In the case of a well control word this parameter has no significance as a well contains only one data packet.

The stack size code (SS) is used to indicate the maximum number of data packets which can be placed in the stack (i.e., capacity) and is set and remains unaltered throughout all manipulations. In the case of a well control word this parameter will be set to one. The total well count (TWC) is used to indicate the number of 10-bit characters in a packet and this parameter remains constant.

As mentioned previously there are three stack/well control words physically placed in the three lower number locations from the first location of the stack or well.

In the location having an address directly prior to that of the main well or stack control word is the "input control word" ICW and this word again has three sections (i) a current input location code (CL) section, (ii) a well or stack position (input) code (SP) section and (iii) an input character position code (CP) section.

The current input location code (CL) is used to define the location at which the next input of data will commence.

The stack position code (SP) is used to define the number of packet areas remaining free in the stack and is decremented by one for each successful data packet transfer and has no significance as far as a well is concerned.

The character position code (CP) is used to indicate into which quadrant the next data character is to be placed and it is incremented by one for each data character transferred to the well or stack.

Located directly "above" (i.e., having an address which is one place lower in significance) the input control word is the output control word. This output control word OCW is of similar form to the input control word ICW and, when the stack is empty, it will be set to the same conditions as that input control word. The operations performed on the output control word will be the same as those performed on the input control word but they will be activated by the output instructions UST (unload stack) and EX (extract) instructions.

The significance of the various parameters of the stack and well control words will be more readily appreciated when considering the detailed micro-program for the various instructions shown in FIGS. 4 to 8. However it should be noted that in some cases the well control words are not all used. For example if a well is to be serviced exclusively by "load-stack" or "unload stack" instructions, (i.e., the associated routine is accessed or outputs to a routine or routines exclusively located within the same data processor as the routine), the control words are not required at all and the A address of these instructions relates to the first (or initial) location of the well. In the case of an extract instruction associated with a well-to-stack transfer the input control word of the well is not required and therefore remains blank while in the case of an insert instruction associated with a stack-to-well transfer the output control word of the well is not required and will therefore not be required.

Consideration will now be given to the micro-program for each of the above mentioned instructions with reference to FIGS. 4 to 8a. In the following description a number of tables showing the control signals generated by the control unit will be shown. Included in these tables a symbol := will be used and this symbol equates to "becomes". For example a control signal SDAQ1:=AAR will be shown and this indicates that quadrant Q1 of SDA becomes AAR (i.e., the contents of register AAR are placed in quadrant Q1 of register SDA). Each transfer performed leaves the transferred data in both the sink and the source of that transfer.

The following flow diagrams (FIGS. 4 to 8b) show the operations performed by the data processing device in its "execute phase," under the control of the control unit CU (FIG. 1c), for each instruction provided by the invention. It will be recalled that the data processing device is organised such that the A and B addresses, in absolute form, will be in registers AAR and BAR respectively at the start of the "execute phase" and the sequence control number will have been incremented into register SCR or, in the case of an interrupted data processing device, register LIR. The various steps in the drawings of the micro-programs have been numerically referenced and the following description will be similarly referenced.

Figure 4:
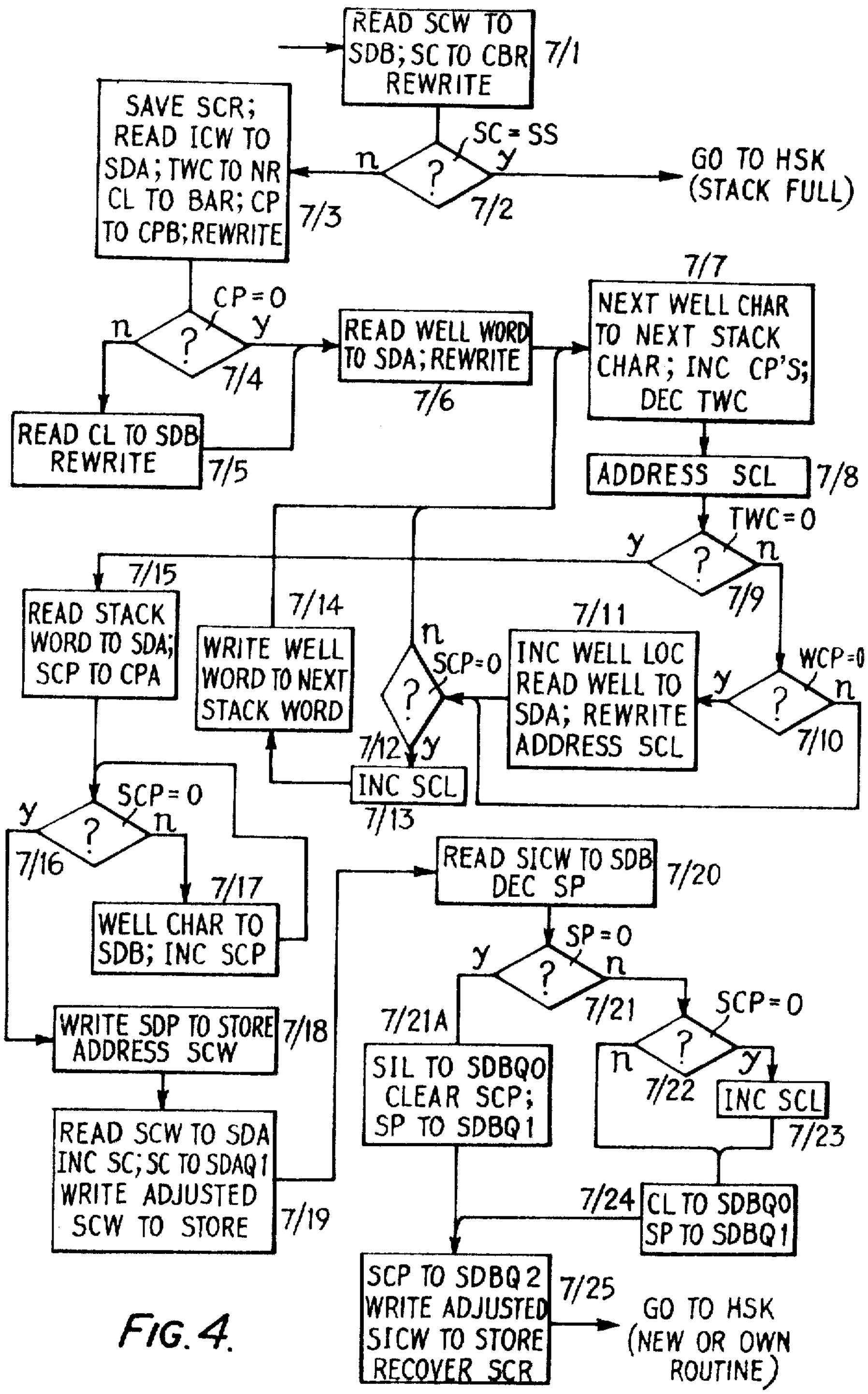

7. Load Stack Instruction (FIGS. 2a and 4)

It was mentioned previously, with reference to FIG. 2a, that the load stack instruction is used to control a well-to-stack transfer, when the store locations used for the well and stack are both in the same store, at the end of an asynchronous working routine. The execute phase of the load stack instruction is entered, therefore, at 7/1 in FIG. 4 with a data packet in the store locations allocated to the well of the associated asynchronous working routine. The initial location absolute address for the O/P WELL will be in register AAR and the stack control word absolute address for the stack, to which the data packet is to be transferred, will be in register BAR. The form of the control words for the stack are shown in FIG. 3 section (viii).

Step 7/1. The following table shows the control signals generated to cause the stack control word (SCW) to be read from the store CS (FIG. 1*b*) into register SDB (FIG. 1*b*), the stack condition code (SC), defining the number of packets currently in the stack, to be transferred from quadrant QO of register SDB (FIG. 1b) to the character base register CBR (FIG. 1*a*) and the stack control word to be written back to the store CS.

| CONTROL SIGNALS | Operation performed |
|---|---|
| RSA:=BAR | Address stack control word |
| READ; SDB:=STORE I/P | Read stack control word to SDB |
| CBR:=SDBQ0 | Transfer SC to CBR |
| REWRITE; STORE:=SDB | Rewrite stack control to store |

Step 7/2. The following table shows the control signals generated to cause the stack condition code (SC) to be compared with the stack size code (SS) in the arithmetic unit AU (FIG. 1c).

| CONTROL SIGNALS | Operations performed |
|---|---|
| AU:=CBR | Transfer SC and SS to Arithmetic unit. |
| AU:=SDBQ1 COMPARE | Compare magnitude of data words in Arithmetic unit. |

The arithmetic unit will produce one of a pair of condition signals, within the group of condition signals shown as one lead AUCS in FIG. 1*b*, indicating (i) that the stack condition (SC) and the stack size (SS) codes are equal or (ii) that they are not equal. If SC=SS the stack is full and the "load stack" instruction is terminated and the data processing devices housekeeping phase is entered as a fault on the routine extracting data packets from the stack.

If SC ≠ SS the load stack instruction micro-program can proceed to step 7/3.

Step 7/3. The following table shows the control signals generated to cause the sequence control number of the next instruction to be preserved in the link register LIR, the stack's incoming control word (ICW) address to be read from the store CS to register SDA, the total well count TWC to be transferred to register NR, the current location code (CL) of the stack incoming control word to be transferred to register BAR and the character position code (CP) to register CPB.

| CONTROL SIGNALS | Operations performed |
|---|---|
| LIR:=SCR | SCR transferred to LIR |
| HIC:=BAR; −1 | Decrement SCW to form stack |
| RSA:=HIC | ICW address in SCR and |
| SCR:=HIC | address store with ICW. |
| READ; SDA:=Store O/P | Read stack ICW from store to SDA |
| NR:=SDBQ2 | Transfer TWC to NR |
| BAR:=SDAQ0 | Transfer CL to BAR |
| MR:=SDAQ1 | Transfer SP to MR |
| CPB:=SDAQ2 | Transfer CP to CPB |

Step 7/4. In this step the stack incoming control word character position code CP in register CPB is tested for zero. This operation will be performed by the control unit CU "observing" the control signal lead CPB=0. If CP≠0 it indicates that part of the last accessed stack word for an input operation has been used to store the latter characters of the data packet previously transferred to the stack. It is necessary under such circumstances for these previously used quadrants of the current location word to be preserved and this is performed in step 7/5. If CP=0 it indicates that the current location defines the next completely empty location in the stack.

Step 7/5. The control signals generated in this step will be as follows:

| CONTROL SIGNALS | Operations performed |
|---|---|
| RSA:=BAR | Address store at CL |
| READ; SDB:=STORE O/P | Read CL word into SDB |
| REWRITE | WRITE CL word back to store. |

Step7/6. In this step the first well word (i.e. the first four data characters of the data packet) is read from the store into register SDA. The following table shows the control signals generated.

| CONTROL SIGNALS | Operations performed |
|---|---|
| RSA:=AAR | Address store at initial |
| READ; | Location of well and read |
| SDA:=STORE O/P | into SDA. |

At this stage the first word of the data packet to be transferred resides in register SDA, the last characters of the previous data packet transferred to the stack, if any, are in register SDB, register CPA is cleared, register CPB is set to the incoming CP of the stack, register MR contains the SP of the stack, register NR contains the TWC of the stack, register BAR contains the CL of the stack and register AAR contains the initial location address of the well. The micro-program now performs the required transfer.

Step 7/7. In this step a single well data character is transferred from register SDA into the next available quadrant in register SDB and the character position codes of both well and stack are incremented by one while the stack total well count is decremented by one. The setting of registers CPA and CPB define the quadrant for SDA and SDB respectively involved in the data character transfer.

| CONTROL SIGNALS | Operations performed |
|---|---|
| SDBQ?:=SDAQ? (CPB) (CPA) | Transfer next char. from SDA to SDB (quadrants defined by CPA & CPB) |
| HLC:=NR; −1<br>NR:=HIC | Decrement TWC |
| HIC:=CPA; +1<br>OPA:=HIC | Increment well CP |
| HIC:=CPB; +1<br>CPB:=HIC | Increment stack CP. |

Step 7/8.

| CONTROL SIGNALS | Operations performed |
|---|---|
| RSA:=BAR | Address store at CL of stack |

Step 7/9. In this step register NR is tested to see if the last character transferred was the last in the data packet (i.e. TWC=0). If TWC=0 the micro-program will step to step 7/15 to end the transfer. If TWC ≠ 0 step 7/10 is performed.

Step 7/10. In this step register CPA is tested to see if the last character transferred to register SDB was the last of the current well word (i.e. the well CP=0). If the well CP=0 step 7/11 is performed to read out the next well word. If CP ≠ 0 step 7/12 is performed.

Step 7/11.

| CONTROL SIGNALS | Operations performed |
|---|---|
| HIC:=AAR; +1 } AAR:=HIC | Increment well CL by one |
| RSA:=HIC | Address store at well CL |
| READ/REWRITE | Read next well word to SDA and rewrite |
| SDA:=STORE O/P | |
| RSA:=BAR | Address store with stack CL. |

Step 7/12. In this step register CPB is tested to see if the linking of these routines by the "stack-to-well" and "well-to-stack" operations of the invention into the fourth quadrant (i.e. stack CP=0). If the stack CP=0 steps 7/12 and 7/13 will be performed causing the newly assembled word in register SDB to be written into the current stack location addressed in 7/8 or 7/11. Prior to this operation the stack CL in register BAR is incremented but not used in step 7/14.

If the stack CP ≠ 0 (i.e. register SDB is not yet full) step 7/7 is performed for the transfer of apparatus for use with the next well data character to register SDB.

Step 7/13.

| CONTROL SIGNALS | Operations performed |
|---|---|
| HIC:=BAR; +1 } BAR:=HIC | Increment stack CL by one |

Step 7/14.

| CONTROL SIGNALS | Operations performed |
|---|---|
| READ | |
| WRITE;STORE I/P:=SDB | Write assembled word to stack |

The loop formed by steps 7/7, 7/8, 7/9, 7/10, (7/11), 7/12 (7/13, 7/14) and 7/7 will be performed for each data character in the well with the consequent store address adjustments as required. Eventually the stacks total well count will be reduced to zero indicating that the last data character in the data packet has been transferred to register SDB. When this occurs the micro-programme will jump from step 7/9 to step 7/15 to cause the store to be read at the stack location defined in step 7/8.

Step 7/15.

| CONTROL SIGNALS | Operations performed |
|---|---|
| READ; SDA:=STORE O/P | Read stack word into SDA |
| CPA:=CPB | Set CPA to stack CP |

Step 7/16. In this step the state of the stack current character position code (CP) is tested and if it is zero it indicates that the transfer is complete. However if it is not equal to zero it indicates that step 7/15 was entered with two or three data characters in register SDB. It is therefore necessary not only to transfer these remaining data characters to store but also to ensure that the "unused" data character quadrants of the current stack location are also transferred back into the store as these quadrants may contain the first characters of another data packet.

This latter operation is performed by the loop formed by steps 7/16 and 7/17 with the data character transfer controlled by the setting of CPA.

Step 7/17.

| CONTROL SIGNALS | Operations performed |
|---|---|
| (IFCPA=01) SDBQ1:=SDAQ1 | Transfer one data character of other data packet from SDA to SDB. |
| (IFCPA=10) SDBQ2:=SDAQ2 | |
| (IFCPA=11) SDBQ3:=SDAQ3 | |
| HIC:=CPA; +1 | Increment CPA |
| CPA:=HIC | |

When the other data packet characters have been transferred register CPA will be zero and step 7/18 will be performed causing the assembled word in register SDA to be written back into store at the location read in step 7/15. It should be noted that step 7/18 will return the word unmodified if the first "access" of stop 7/16 found CPA=0.

Step 7/18.

| CONTROL SIGNALS | Operations performed |
|---|---|
| WRITE | Write SDB to store at last location of data packet. |
| store I/P: =SDB. | |
| RSA:=SCR | Address store at Stack OW. |

The addressing of the stack control word in this step starts the writing back to store of updated stack control words.

Step 7/19.

| CONTROL SIGNALS | Operations performed |
|---|---|
| READ | Read stack main control word into SDA |
| SDA:=store O/P | |
| HIC:=CBR; +1 | Increment stack condition SC by one and place new SC in SDAQ0 |
| SDAQ0=HIC | |
| WRITE | Write adjusted stack main control word to store. |
| Store I/P:=SDA | |

Step 7/20.

| CONTROL SIGNALS | Operations performed |
|---|---|
| HIC:=SCR; −1 | Address store at stack ICW. |
| RSA:=HIC | |
| READ; SCB:=STORE O/P | Read ICW to SDB |
| HIC:=MR; −1 | Decrement SP by one |
| M:=HIC | |

Step 7/21. In this step the stack position code SP in register M is tested for zero. If it is zero this indicates that the data packet has been put in the last packet area in the store and, therefore, the current location code CL in the input control word ICW must be adjusted, this operation is performed in step 7/21A. If M ≠ 0 step 7/22 is performed.

Step 7/21A

| CONTROL SIGNALS | Operations performed |
|---|---|
| HIC:=SCR; +1 | |
| BAR:=HIC | Form first data word address of stack in SDBQ 0. |
| HIC:=BAR; +1 | |
| SDBQ0:=HIC | |
| CPB:=0 | Clear CPB. |

Step 7/22. In this step the stack character position CP is tested for zero. If it is zero the current location code in register BAR must be incremented by one, in step 7/23, before being written into register SDB at quadrant Q1 in step 7/24. If CP ≠ 0 step 7/24 is performed direct.

Step 7/23

| CONTROL SIGNALS | Operations performed |
|---|---|

| | |
|---|---|
| HIC:=BAR; +1 | Increment stack CL by one |
| BAR:=HIC | |

Step 7/24

| CONTROL SIGNALS | Operations performed |
|---|---|
| SDBQ0:=BAR | Adjusted CL to SDBQ0 |
| SDBQ1:=MR | Adjusted SP to SDBQ1 |

Step 7/25

| CONTROL SIGNALS | Operations performed |
|---|---|
| SDBQ2:=CPB | Stack word CP to SDBQ2 |
| WRITE | Write adjusted stack main control |
| store I/P:=SDB | word to SCW. |
| HIC:=LIR; +1 | Increment Sequence control |
| SCR:=HIC | number into SCR. |

Exit from step 7/25 is to the housekeeping phase and entry into the next instruction to be handled (i.e. a new routine or entry into the same routine).

In either case it will be necessary to perform an "unload" stack instruction before performing the actual asynchronous working routine.

Figure 5:
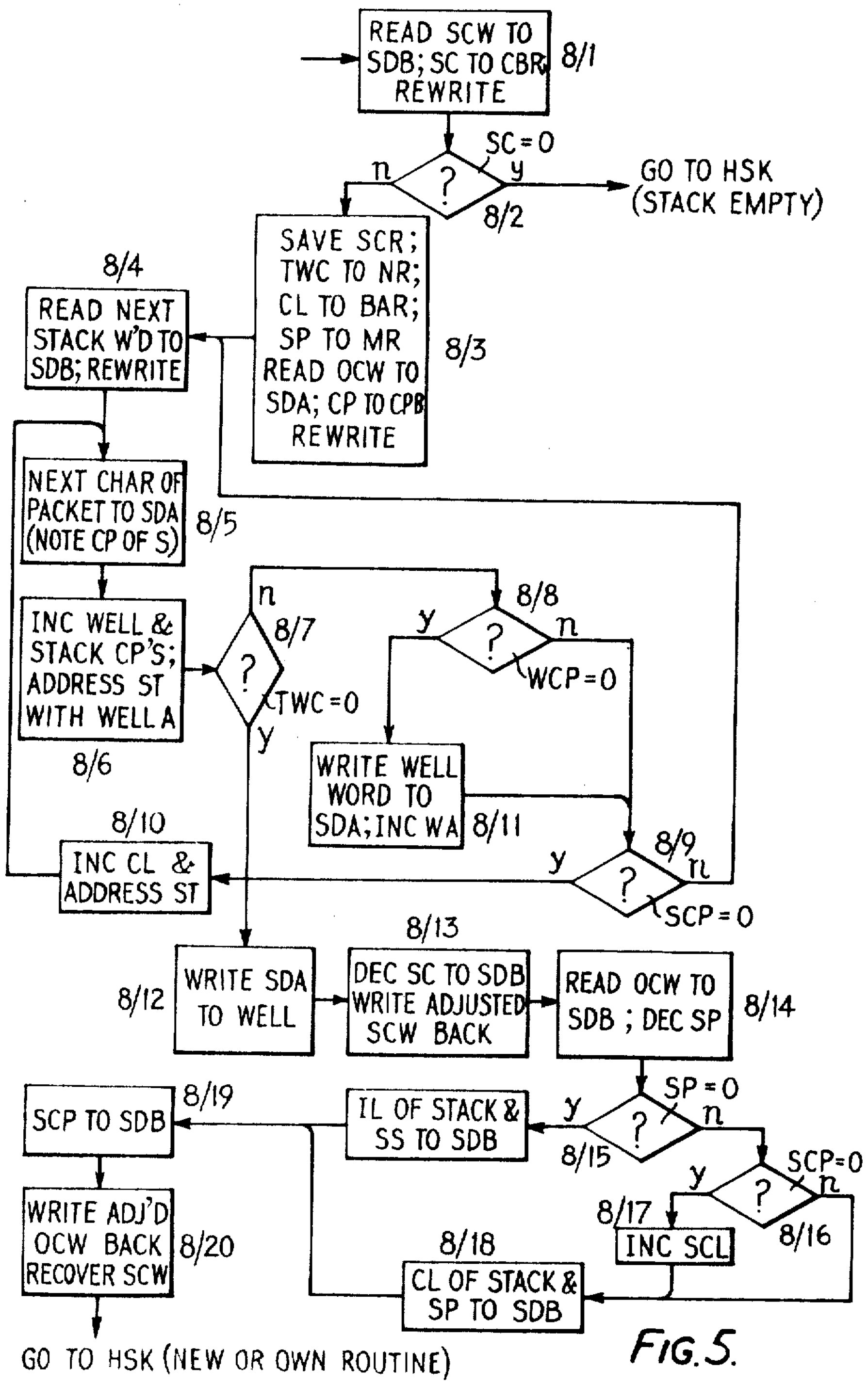

8. Unload Stack Instruction (FIGS. 2b and 5)

This instruction is complementary to the load stack instruction and is used to control a stack-to-well transfer, when the store locations used for the stack and well are both in the same store, at the start of an asynchronous working routine. The following description will include tables of the control signals produced to perform the actions of the steps of the micro-program flow diagram of FIG. 5 when those steps are self-explanatory. The execute phase of the unload stack instruction is entered, at 8/1 in FIG. 5, with the initial location address of the well in register AAR and the stack control word address in register BAR.

Step 8/1

| CONTROL SIGNALS | Operations performed |
|---|---|
| RSA:=BAR | Address store at stack main control |
| READ | word and read |
| SDB:=Store 0/P | SCW into SDB. |
| REWRITE | Transfer stack condition SC |
| CBR:=SDBQ0 | to CBR |

Step 8/2. In this step the state of the stack condition SC in register CBR is tested. If CBR=0 the stack will be empty indicating that there is no data packet available. The data processing device will exit from the unload stack instruction and perform a housekeeping routine to find out why the stack is empty. If SC ≠ 0 a data packet is available and step 8/3 is performed.

Step 8/3

| CONTROL SIGNALS | operations performed |
|---|---|
| LIR:=SCR | Save Sequence control number |
| HIC:=BAR; −1 | Transfer ICW address to SCR |
| SCR:=HIC | |
| HIC:=SCR; −1 | Address store with OCW |
| RSA:=HIC | address |
| READ; SDA:=STORE O/P | Read OCW into SDA |
| MR:=SDAQ1 | Transfer SP to MR |
| BAR:=SDAQ0 | Transfer CL to BAR |
| NR:=SDBQ2 | Transfer TWC to NR |
| REWRITE | rewrite OCW to store |

Step 8/4

| CONTROL SIGNALS | Operations performed |
|---|---|
| RSA:=BAR | Address store with stack CL |
| READ; SDB:=STORE O/P | Read stack word into SDB |
| REWRITE. | |

Step 8/5

| CONTROL SIGNALS | Operations performed |
|---|---|
| SDAQ?:=SDBQ? | Transfer data character from |
| (note CPA & CPB) | SDB to SDA noting stack and well character position codes. |

Step 8/6

| CONTROL SIGNALS | Operations performed |
|---|---|
| HIC:=CPA; +1 | Increment well character position |
| CPA:=HIC | by one |
| HIC:=CPB; +1 | Increment stack CP by one |
| CPB:=HIC | |
| HIC:=MR; −1 | Decrement total well count by one |
| NR:=HIC | |
| RSA:AAR | Address store at next well word. |

Step 8/7. In this step the total well count TWC is tested to zero. If TWC ≠ 0 it indicates that the transfer of the data packet is not yet complete and step 8/8 will be performed. If TWC=0 it indicates that the transfer of the data packet is complete and the adjusted control words must be restored to store.

Step 8/8. In this step the character position code of the well is tested and if it is zero the contents of register SDA are written into the current location of the well and that address code in register AAR is incremented by one, step 8/11. If the well CP ≠ 0 step 8/9 is performed.

Step 8/9. In this step the character position code of the stack is tested and if it is zero the store is addressed at the next location in the stack and that word is read into SDB and the stack current location code in register BAR is incremented by one step 8/10. If CP ≠ 0 the micro-program returns to step 8/5.

From the above it will be seen that successive characters are transferred from the stack locations into the well locations. Ultimately the total well count (TWC) will be zero and step 8/7 will exit to step 8/12.

Step 8/12

| CONTROL SIGNALS | Operations performed |
|---|---|
| READ | Write SDA to CL of well |
| WRITE; STORE I/P:=SDA | (address in step 8/6) |

The remaining steps 8/13 to 8/20 in the micro-program deal with the updating of the stack control words and are similar to those of the previous load stack instructions.

The exit from step 8/20 is to the housekeeping phase and entry into the first instruction of the asynchronous working routine associated with the well.

The above description of FIGS. 4 and 5 has been with reference to the load and unload stack operations. Reference has only been made to the stack control words. The well control words are not used and would therefore, not be provided if the well is exclusively accessed by load and unload stack instructions.

As mentioned previously before each well-to-stack and stack-to-well transfer involving one of the external data highways the initial highway connection is established by a "-prepare for transfer" instruction.

Figure 6:
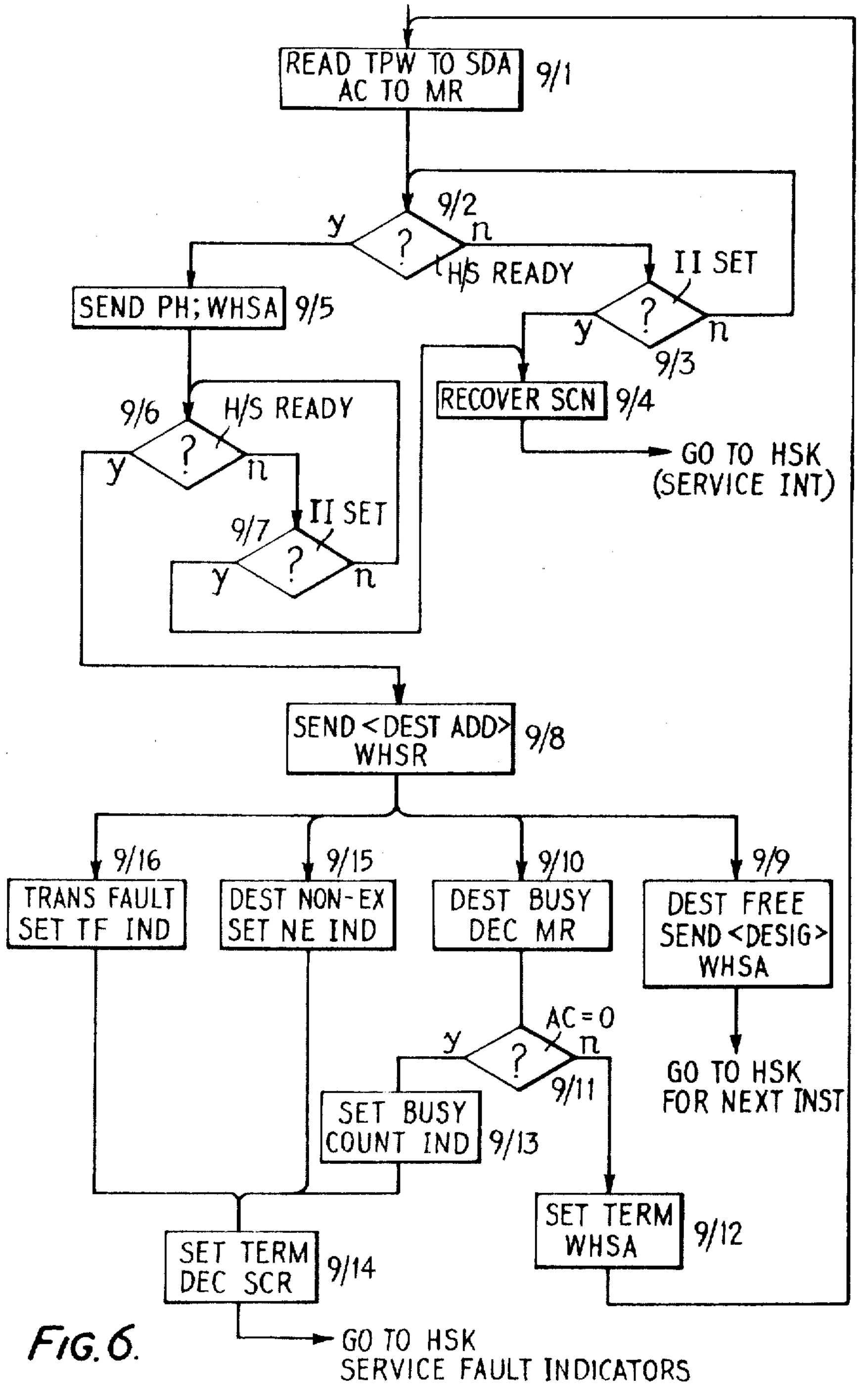

9. Prepare for Transfer Instruction FOR TRANSFER INSTRUCTION (FIG. 6)

In the following description no reference will be made to the control signals produced by the data processing device in the performance of the micro-program and each step in the micro-program will be considered briefly from a functional point of view. At the start of the execute phase for this instruction the A address register AAR will contain the attempt count (AC) and the B address register BAR will contain the address of the transfer parameters word (TPW).

Step 9/1. In this step the transfer parameters word (FIG. 3 section vii) is read into register SDA and the attempt count into register MR.

Step 9/2. In this step the highway station HSE is tested to see if it is ready for control of the transfer. If the highway station is not ready, the highway station ready signal will be at 0 and the micro-program "loops" back to 9/2 after testing the data processing devices interrupt toggle (II) in step 9/3.

Step 9/3. If the interrupt toggle is set the micro-program exits from the PFT instruction into the housekeeping phase after recovering the sequence control number, step 9/4, to service the interrupt. If the interrupt indicator is not set the micro-program returns to step 9/2. Ultimately the highway station HSE will signal a ready condition.

Step 9/5. In this step the highway station HSE is conditioned with the "permitted highways" code (PH) which is used by the buffer unit BU (in FIG. 1c) to select a highway control circuit which is connected to a free highway. When the highway station has accepted the permitted highways code it will produce the highway station accept signal, allowing the step 9/6 to be performed (note WHSA = wait for highway station accept signal).

Step 9/6. In this step the highway station ready signal is tested, this signal will be generated when the highway station has established connections to one of the external data highways. Prior to the generation of the ready signal the loop of 9/6, 9/7, 9/6 is performed allowing exit to the housekeeping phase if the interrupt toggle (II) becomes set in step 9/7. When the ready signal is produced step 9/8 is performed.

Step 9/8. In this step the destination address, in quadrant Q1 of register SDA, is passed to the buffer unit BU in the highway station HSE and circulated to try to select the required other equipment of the transfer. The destination address will be circulated around the selected highway and the destination data processing device will return either (i) Destination Free (step 9/9), (ii) Destination Busy (step 9/10), (iii) Destination Non-Existent (step 9/15) or (iv) Transmission Fault (step 9/16). If the destination device is free its interrupt toggle II will be set and the current process in that device will be suspended for the duration of the transfer.

Step 9/9. Destination Free. The performance of step 9/9 causes the designation code (quadrant Q2 of register SDA) to be transmitted around the highway and when the highway station accepts this code the micro-program exits to the housekeeping to execute the next instruction which will be either an extract or insert instruction.

Step 9/10. Destination Busy. The performance of this step causes the attempt count (AC) in register MR to be decremented by one. The attempt count is then tested for zero (step 9/11) and the micro-program returns to step 9/1, by way of step 9/12 which terminates the highway connection, to make a further attempt at setting up the required transfer connection. If the attempt count has been exhausted step 9/13 is performed to set a "destination busy" indicator and the micro-program exits to a housekeeping routine, by way of step 9/14 which restores the sequence control number of the PFT to register SCR and terminates the highway connection.

Step 9/15 and 9/16 faults. The performance of either of these steps causes the setting of a corresponding indicator toggle and the entry into the housekeeping phase by way of step 9/14.

The attempt count system is provided in this instruction to ensure that two co-operating data processing devices do not interact in such a manner that each is waiting for the other to initiate a given inter-processor connection. Such a situation may occur with a PFT instruction which seizes a highway and attempts to seize the destination highway station and finding it busy re-attempts until it succeeds. It could happen that the other data processing device is concurrently using a PFT instruction to establish communications with the first data processing device on another highway. The PFT instruction is made interruptable, at steps 9/3 and 9/7, by a destination address, arriving on another highway, up to the time that it receives the destination free condition. Thus, any destination address of higher priority arriving on a highway will automatically interrupt the PFT in this period.

The repeated attempt feature is included in this instruction as it is more efficient to constantly re-apply to a busy data processing device than it is to jump to another asynchronous working routine setting links for a return to the PFT instruction. This is due to the fact that the delay cannot be due to processing by the busy data processing device as the input/output system is of the autonomous data transfer type and must, therefore, be due to a highway transfer and the device will be freed as soon as the transfer is complete. The attempt count is used to prevent the demanding data processing device becoming tied to a faulty highway or destination device.

As mentioned previously the PFT instruction is followed by an extract or insert instruction which co-operates with an insert or extract instruction in the destination device the instructions being "locked together" by the interacting highway system. FIG. 7 shows the flow diagram of the extract instruction, which can be entered with the interrupt toggle reset (i.e. following a PIT instruction) or with the interrupt toggle set (i.e. when the device is the destination device of a required transfer).

10. Extract Instruction (FIG. 7)

This instruction is entered after a PFT instruction or as the result of an interrupt after the setting up of a highway transfer path.

Step 10/1. In this step the stack or well control word is read from the store and rewritten and placed in register SDA and the total well count TWC is placed in register MR.

Step 10/2. The interrupt toggle (II) is tested in this step and the SCR contents are transferred to the link register LIR in step 10/3 if this instruction follows a PFT (i.e. II = 0). This indicates that the instruction will operate on an output well. If the data processing device is the destination device of the initial transfer connection (i.e. II ≠ 0) the extract order relates to a stack and steps 10/4 and 10/5 are performed to test the stack condition code SC to see if the stack is empty. If it is empty the extract instruction will be terminated and the housekeeping phase entered from step 10/5 to service this condition. If the stack is not empty or the interrupt toggle is not set step 10/6 will be entered.

Step 10/6. In this step the output control word OCW for the well or stack is read into register SDA. The current location (i.e. the store location address of the first word of the data packet) is fed to register AAR; the stack position code SP is fed to register NR and the character position code CP is fed to CPA. If the output control word relates to a well the SP code has no significance, as a well holds only one data packet, and the CL address code will be that of the location following the main well control word while the CP code will be zero.

Step 10/7. In this step the first data word of the packet is read out of the current location into register SDA.

Step 10/8. The micro-program halts at this point waiting for a highway station ready signal. In the case of the extract instruction following a PFT instruction (i.e. a WELL-TO-STACK transfer FIG. 2c) the highway station will produce a ready signal when the designation address has conditioned the other data processing device for the performance of the co-operating insert instruction. In the case of the extract instruction entered as a result of an interrupt (i.e. a STACK-TO-WELL transfer FIG. 2d) the highway station will produce a ready signal when the originating data processing device has signalled the acceptance of the destination free code signalled in response to the destination address.

Step 10/9. When the highway station ready signal is produced the highway station will also produce a "continue" signal, which is tested in this step, if the transmitted code agrees with the returned code indicating that the transfer can continue. If any other code has been received by the highway station step 10/9 exits to the fault routines of the house-keeping phase.

Step 10/10. In this step the next data character, as defined by the code of register CPA, is passed to the data buffer register BDR in the highway station from register SDA and the code register CR is conditioned to the "data character" code (i.e. 0110 on the highway code wires). Thus the next character is passed to the selected highway, while the character position CP code (in register CPA) is increased by one and the total well count TWC is reduced by one. Step 10/11 is performed when the highway station signals the acceptance of the data character.

Step 10/11. The total well count is tested for zero in this step and if it is not zero step 10/12 testing the character position for zero and, if required step 10/13, reading out the next data word if CP=0, are performed before entering step 10/18 again prior to the transmission of the next character by step 10/10. Step 10/8 ensures that the next character is not sent until the highway system and the destination data processing device has handled the last data character.

When the total well count reaches zero the data packet transfer is complete and step 10/14 tests to see if the end of block code has been sent from the destination device. If not a fault has occurred and the housekeeping routine is entered. If the end of block signal has been received step 10/15 is performed.

Step 10/15. In this step the following operations are performed (i) termination of the highway connection, (ii) the resetting of the interrupt indicator if set and (iii) the writing back into store of the adjusted main stack or well control word after decrementing the stack condition (SP) code in register CBR. Step 10/15 has no effect if the extract order relates to a well.

The following steps 10/16 to 10/22 are used to update the output control word OCW and are somewhat self-explanatory ending, at step 10/22, with the writing back to store of the adjusted well or stack output control word and the recovering of the sequence control number for the exit from the instruction.

As mentioned above each extract instruction co-operates with an insert instruction. The flow diagram of the insert instruction is shown in FIG. 8 which is formed by FIGS. 8*a* and 8*b*. The diagram is split into two parts as the insert instruction can be entered with the interrupt toggle reset FIG. 8*a* (i.e. following a PFT instruction) for a stack-to-well transfer (FIG. 2d) or with the interrupt toggle set FIG. 8*b* (i.e. as a result of the reception of a valid designation address code) for a well-to-stack transfer (FIG. 2*c*).

11. Insert Instruction (FIGS. 8*a* and 8*b*)

The following description will be split into two sections A and B corresponding to the "insert" instruction without the interrupt toggle set and the "insert" instruction with the interrupt toggle set respectively.

Initially the insert instruction is entered at step 11/1 which reads the stack or well main control word into register SDB followed by step 11/2 which tests the interrupt indicator II.

11A. INSERT INSTRUCTION with II reset

This instruction is used for a stack-to-well transfer, the well being in this device, when the transfer has been originated by this device. The flow diagram of FIG. 8*a* is used in this case after the testing of the interrupt indicator II step 11A/3 will be performed, the well main control word having been read in step 11/1.

Step 11A/3. In this step the address of the initial location of the well is formed in the B address register BAR and the total well count TWC is placed in register MR. The exit from this step is dependent upon the highway station ready signal which will be produced when the co-operating signals associated with the designation address code have been completed. When this occurs the highway station will produce a "continue" signal indicating that no transmission faults have occurred and step 11A/5 will be performed. If a transmission fault has occurred step 11A/4 will exit to the house-keeping phase.

Step 11A/5. In this step the "response change-over" code (1101) is sent to the destination device to indicate that the direction of data packet transfer is from the stack in that destination device to the well in this device. The total well count TWC is decremented by one in this step as the highway station is waiting for the first character of the data packet. When this character arrives step 11A/6 is performed testing to see if a valid data character code has been received. If it has not been received a test is made to see if an "end of message" signal is present indicating a fault in the remote device and the termination of the transfer. If the highway station signal is neither a "data character" or an "end-of-message" signal the housekeeping phase is entered as a transmission fault has occurred.

If the receive data is the first data packet character step 11A/8 is performed.

Step 11A/8. In this step the data character is recirculated with a data accept code.

Step 11A/9. In this step the received data character is fed into the quadrant define d by the current setting of the character position code CP in register CPA. The device now waits for the next character to be received and transferred to register HDR.

Step 11A/10. In this step a test is made to see if the received data, in step 11A/9, is a data character. If it is not a data character step 11A/11 is performed to test for the "end of message" signal. If the highway station indicates neither a "-data character" or an "end of message" signal a fault in the highway system has occurred and the "insert" instruction is ended by an entry into the housekeeping phase. If the signal is an "end of message" signal the transfer is terminated by entry into step 11A/19. If the received code is a data character step 11A/12 is performed.

Step 11A/12. The total well count TWC in register MR is tested for zero in this step. If the total well count is zero it indicates that the transfer of the data packet, as far as this data processor is concerned, is complete (i.e. the well is full) and steps 11A/16, 11A/17 and 11A/18 are performed sending the "end of block" code (1010), testing of the consequentially received code for "end of message" and the incrementation of the character position code CP before entry into step 11A/19 for the ultimate termination of the transfer.

If the total well count is not zero, indicating that the data packet transfer is not complete, step 11A/13 is performed.

Step 11A/13. In this step the character position CP is incremented, to define the quadrant in register SDA to which the data character received in 11A/9 is to be transferred. The total well count is decreased by one and the data received is recirculated with the "data character" code (0110) by the signalling of data accept to the highway station equipment. This step is only completed when the next data character from the stack has been received by the highway station equipment.

Step 11A/14. In this step the character position code is tested for zero and, if it is zero, the assembled data word is written into the current location of the well from register SDA and the current location address incremented by one in step 11A/15 before re-entering step 11A/9. If CP ≠ 0, the micro-program returns to step 11A/9 to handle the next data character of the data packet by steps 11A/9 11A/10, 11A/12, 11A/13, 11A/14 and if required 11A/15. Ultimately the total well count TWC will equal zero causing steps 11A/16, 11A/17 and 11A/18 to be performed after step 11A/12.

Step 11A/19. In this step the last character is retransmitted back to the originating device under the control of the highway station equipment control signal "data accept".

Step 11A/20. In this step the character position code CP is tested and if zero the assembled data word is written into store at the current location of the well and that address is incremented in step 11A/21. If CP ≠ 0 and after step 11A/21 the last data character is transferred to register SDA under the control of the character position code and the data word of SDA is written into the last location of the well in step 11A/22. Finally the sequence control number is increased allowing the asynchronous working routine servicing the input well to be commenced.

11B. INSERT INSTRUCTION with interrupt toggle set (FIG. 8*b*)

This instruction is used for a well-to-stack transfer, the stack being situated in this device, and the transfer has been originated by the device in which the well is situated. The interrupt toggle II is set as the routine being processed has been interrupted for the autonomous data transfer. The flow diagram of FIG. 8b is used in this case after the testing of the interrupt indicator (step 11/2). Step 11/1 reads the main stack control word SCW into register SDB.

Step 11B/3. The stack condition code SC is transferred to register CBR in this step to allow step 11B/4 to compare this code with the stack size code SS.

Step 11B/4. In this step the contents of register CBR and register SDB quadrant Q1 are passed to the arithmetic unit which compares the size of these codes. If SS=SC the stack is full, the insert instruction micro-programme is terminated by an entry into the housekeeping phase. If SS ≠ SC, indicating that there is at least one data packet area free in the stack, step 11B/5 is performed.

Step 11B/5. In this step the total well count is transferred from register SDBQ2 to register MR; the address in register BAR is decremented to form the input control word address which is read into register SDA; the total well-count is decreased by one ready for the reception of the first data character; the current location address code CL is transferred into register AAR from quadrant Q0 of register SDA; the Stack position code SP is transferred into register NR from register SDAQ1; the stack character position CP is transferred into register CPA from register SDAQ2 and the input control word ICW is rewritten.

Step 11B/6. In this step the character position is tested for zero. If CP=0 step 11B/7 is performed, while if CP ≠ 0 step 11B/6A is performed, to read out the current location word which will contain one, two or three data characters of the last inputted data packet, followed by step 11B/7.

Step 11B/7. The micro-program is held at this point until the first data character of the packet arrives. When this occurs it is tested to see if it is a data character, in step 11B/8. If the received character is not a data character the execution of the insert instruction is terminated and the data processor performs a housekeeping routine to define what fault has occurred. If the received character is a data character step 11B/9 is performed.

Step 11B/9. In this step the received data character is transferred to register HDR and the data character recirculated with the data character code.

Step 11B/10. In this step the recently received data character is written into register SDA, at a quadrant defined by the state of the CP code in register CPA. The current location of the stack is also addressed in this step and the exit from the step is held until the next data character has been received by the highway station HSE. When the next data character is received step 11B/11 is performed.

Step 11B/11. In this step the highway station is tested for an "end of message" indication to see if the data packet is complete. If the data character received is not the end of the data packet it is tested, in step 11B/12, to see if it is a valid data character after incrementing by one the character position code CP in step 11B/11A. If it is a valid character the total well count TWC, in register MR, is tested for zero in step 11B/13 and step 11B/14 is performed if TWC ≠ 0. If the data character is not valid step 11B/12, or if TWC=0 step 11B/13, the instructions execution is terminated and a fault housekeeping routine entered.

Step 11B/14. The recirculation of the received data character around the highway is initiated in this step and the total well count TWC is decreased by one.

Step 11B/15. A test on the character position code CP is made in this step to see if the incrementation of CP in step 11B/11A for the last received data character will fill the last quadrant of register SDA. If CP=0 step 11B/16 is performed writing the assembled data word to the stack and incrementing by one that current location address. If CP ≠ 0, or when step 11B/16 has been performed, the micro-program returns to step 11B/10 for the assembly of the next data character. The loop of steps 11B/10, 11B/11, 11B/11A, 11B/12, 11B/13, 11B/14, 11B/15, 11B/16 if required, 11B/10 for each data character received. Ultimately the transfer of the data packet will be complete and step 11B/11 will detect an "end-of-message" signal from the highway station causing step 11B/17 to be performed.

Step 11B/17. In this step CP is increased by one, for the last data character of the packet, the stack position SP is decreased, for the newly received data packet, and the interrupt indicator is reset ready for re-entry into the interrupted routine after the last character has been stored in the stack and the control words updated and written into their correct locations at the head of the stack. These operations are performed in step 11B/27 and the prior step 11B/18 to 11B/26 are used to recirculate the data character step 11B/19 and to organise the updated control word parameters if the last data packet area of the stack has been used (steps 11B/19, 11B/20 and 11B/25) and adjust the current location address and store the word if the last data character or characters are to be placed in a stack word which is partially used (steps 11B/21, 11B/22, 11B/23 and 11B/24 recirculated for each data character.

The exit from step 11B/27 is to the next instruction of the interrupted asynchronous working routine and the termination of the highway interconnection is under the control of the other data processing device.

From the above description it can be seen that the invention provides a programme interface mechanism between asynchronous working routines, which operate on data packets in an input well producing output data packets in an output well, by the use of a well-to-stack and stack-to-well transfer mechanism. The stacks acting as the time buffer mechanism between routines and the siting of the stacks and wells, in a multi-data-processing device, has no effect at all on the asynchronous working routines themselves. This facility has particular advantages in a large process control system where the entire process control algorithm is broken down into sub-routines which can be written individually. The assembling of the sub-routines into a system configuration simply involves a specific set of instructions according to the invention allowing different hardware systems, requiring different configurations of assembled sub-routines, to be produced without modification to those sub-routines.

The above description has been of one embodiment only and is not intended to be limited thereto. Alternative arrangements of the invention will readily be seen by those skilled in the art, for example the external highway system employed is typical only and may be replaced by a system for example of the type of British Pat. No. 1,063,296 which will cause certain modifications to the micro-programs of the instruction of the invention. Further each data processing device is not limited to the type shown in FIGS. 1*a*, 1*b* and 1*c* this being only typical of such devices.

Additionally each transfer may be preceded by a "prepare for transfer" operation thus making each routine "look" the same regardless of its location within the multi-processor system and the location of the co-operating routines. In this case the "prepare for transfer" micro-program is modified to allow a decision to be made as to the location of the co-operating routine. An internal transfer will be performed, using "load stack" or "unload stack" operations, if the prepare for transfer operation detects that the co-operating routine is located within the same data processing device while an external transfer will be performed using "insert" or "extract" operations if the co-operating routine is located in another data processing device. The detection mechanism mentioned above may be performed by comparing the destination code for a transfer with those codes which are held in the highway station prior to launching on to the highway system.

Also the stack and well parameters referred to in the specification may be located remote from the stack or well area in a common data area for the associated routine. In this case the destination code is used to "point" to the required common data area while the designation code will define the address of the actual well or stack parameters allowing automatic operations to be performed corresponding to the stack and well instructions.

The latter two modifications have the advantage of buffering the stacks and wells from other routines thus giving greater security against mutilation of stack or well data by faulty data processing devices.

The above description of the teachings of the invention has been related to a multi-processor system in which each processor includes its own programme and data storage arrangements. However, the invention is equally applicable to other multi-processor system configurations. For example it is well known in the prior art to provide a plurality of memory modules which are individually connectable, by way of a switching interlock, to a plurality of processor devices which include only temporary storage facilities. In such cases each program routine may for example be stored in a separate memory module, together with the associated input and output wells while the co-operating stacks may be stored in that or one of the other memory modules.

What we claim is:

1. A method of operating a data processing system in the performance of a manipulative procedure said procedure being divided into a plurality of manipulative functions each of which is performed under the control of a corresponding stored program routine arranged to operate on a data packet said system including for each stored program routine an input data storage area for the storage of a single unprocessed data packet, an output data storage area for the storage of a single processed data packet and first and second further data storage areas each of which are capable of storing a plurality of unprocessed data packets and processed data packets respectively, said method comprising, for the performance of a particular manipulative function, the sequential steps of a. extracting a single unprocessed data packet from said first further data storage area,
b. inserting said unprocessed data packet into said input data storage area,
c. performing said manipulative process by executing the instructions of the corresponding stored program routine to process the data packet in said input storage area to produce a processed data packet in said output data storage area,
d. extracting said processed data packet from said output data storage area and
e. inserting the processed data packet into said second further data storage area.

2. A method of operating a data processing device as claimed in claim 1 wherein said first further data storage area includes transfer control information relevant to the data packets stored therein and said transfer control information includes common transfer control data defining (i) a total block count, indicative of the number of data packets stored in that further data storage area, (ii) a maximum state of count, indicative of the maximum number of data packets said first further data storage area is capable of storing and (iii) a count code indicative of the size of a single unprocessed data packet, and said transfer control information further includes output transfer control data defining (a) an output start address, indicative of the address in said first further data storage area of an unprocessed data packet which is next in sequence for extraction, and (b) an output block count, indicative of the number of unprocessed data packets which have been removed from said first further data storage area, and the method step of extracting a single unprocessed data packet from said first data storage area includes the sub-steps of i. extracting said output start address from said output transfer control data.
ii. reading the next data packet for processing from said first further data storage area using said output start address
iii. incrementing said output block count,
iv. decrementing said total block count and
v. calculating a new value for said output start address.

3. A method of operating a data processing device as claimed in claim 1 wherein said second further data storage area includes transfer control information relevant to the data packets stored therein and said transfer control information includes common transfer control data defining (i) a total block count, indicative of the number of data packets stored in that further data storage area, (ii) a maximum state of count, indicative of the maximum number of data packets said second further data storage area is capable of storing, and (iii) a count code, indicative of the size of a single processed data packet, and said transfer control information further includes input transfer control data defining (a) an input start address, indicative of the address of a data packet area which is next in sequence for the reception of a processed data packet, and (b) an input block count, indicative of the number of processed data packets which have been inserted into said second further data storage area, and the method step of inserting the processed data packet into said second further data storage area includes the sub-steps of i. extracting said input start address from said input transfer control data,
ii. writing the processed data packet into said second further data storage area using said input start address
iii. incrementing said input block count
iv. incrementing said total block count and
v. calculating a new value for said input start address.

4. A method of operating a data processing system in the performance of a manipulative procedure said procedure being divided into a plurality of manipulative functions each of which is performed under the control of a corresponding stored program routine operating on a data packet said system including a plurality of stored program controlled data processing devices each having an individual memory associated therewith and being interconnected by way of a data transfer highway system providing access from any data processing device to any other data processing device and the stored program routines of the procedure are distributed amongst said data processing devices and said system includes for each stored program routine, an input data storage area for the storage of a single unprocessed data packet, an output data storage area for the storage of a single processed data packet and first and second further data storage areas wach of which are capable of storing a plurality of unprocessed data packets and processed data packets respectively and the input data storage area and the output data storage area of a particular stored program routine are stored within the memory associated with the particular data processing device to which said particular stored program routine is allocated whereas said first further data storage area and said second further data storage area may be stored in other ones of said data processing devices and said method comprises, for the performance of a particular manipulative function, the sequential steps of a. establishing an intercommunication path over said data transfer highway system, if said first further data storage area is not stored within the memory associated with said particular data processing device, between said particular data processing device and the data processing device in the memory of which said first further data storage area resides, b. extracting a single unprocessed data packet from said first further data storage area, c. inserting said single unprocessed data packet into said input data storage area, d. performing said particular manipulative function by executing the instructions of said particular stored program routine to process the data packet in said input data storage area and to produce a processed data packet in said output data storage area e. establishing an intercommunication path over said data transfer highway system, if said second further data storage area is not stored within the memory associated with said particular data processing device, between said particular data processing device and the data processing device in the memory of which said second further data storage area resides, f. extracting said processed data packet from said output data storage area and g. inserting the processed data packet into said second further data storage area.

* * * * *